United States Patent
Gassho et al.

(10) Patent No.: US 6,901,863 B2
(45) Date of Patent: Jun. 7, 2005

(54) PRINTER AND PRINT SYSTEM FOR EXECUTING A PROPER PRINT OPERATION ONLY IN A PLACE REGISTERED IN ADVANCE

(75) Inventors: Kazuhito Gassho, Nagano-Ken (JP); Toshihiro Shima, Nagano-Ken (JP); Teruhito Kojima, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/722,693

(22) Filed: Nov. 24, 2003

(65) Prior Publication Data

US 2004/0161277 A1 Aug. 19, 2004

(30) Foreign Application Priority Data

Nov. 27, 2002 (JP) ........................................ 2002-343873
Nov. 27, 2002 (JP) ........................................ 2002-343905
Aug. 25, 2003 (JP) ........................................ 2003-300445
Aug. 25, 2003 (JP) ........................................ 2003-300458

(51) Int. Cl.[7] .............................. B41F 1/54; B41J 5/30; B41J 11/44; G06K 15/00
(52) U.S. Cl. ........................... 101/484; 400/61; 400/76; 358/1.15
(58) Field of Search ........................... 101/484; 400/61, 400/76; 358/1.15; 235/375

(56) References Cited

U.S. PATENT DOCUMENTS

| 6,681,214 B1 | * | 1/2004 | Doljack ........................ 705/75 |
| 6,772,945 B2 | * | 8/2004 | Mahoney et al. ........... 235/380 |
| 2002/0016921 A1 | * | 2/2002 | Olsen et al. ................ 713/200 |
| 2003/0044009 A1 | * | 3/2003 | Dathathraya ................ 380/55 |

FOREIGN PATENT DOCUMENTS

JP 11-331144 11/1999

OTHER PUBLICATIONS

Abstract of Japanese Patent Publication 11–331144, Pub. Date: Nov. 30, 1999, Patent Abstracts of Japan.

* cited by examiner

Primary Examiner—Andrew H. Hirshfeld
Assistant Examiner—Wasseem H. Hamdan
(74) Attorney, Agent, or Firm—Martine Penilla & Gencarella, LLP

(57) ABSTRACT

A printer generates a public key with a passphrase containing at least printer position information, and holds the public key in a public key storage. When transmission of a public key is requested by a print client, the printer reads the public key from the public key storage and transmits the public key. The print clients transmits print transmitting data generated by encrypting print data with the previously acquired public key. The printer which has received the print transmitting data generates a private key with a passphrase containing at least printer position information. The printer decrypts the received print transmitting data with the private key.

44 Claims, 28 Drawing Sheets

TB10: PUBLIC KEY TABLE

| PRINTER | PUBLIC KEY |
|---|---|
| PRINTER-ID1 | PKEY1 |
| PRINTER-ID2 | PKEY2 |
| ⋮ | ⋮ |

TD10 = PRINTER column; TD11 = PUBLIC KEY column

FIG. 8

PRINTER AND PRINT SYSTEM FOR EXECUTING A PROPER PRINT OPERATION ONLY IN A PLACE REGISTERED IN ADVANCE

BACKGROUND OF THE INVENTION

1. Field of the Invention

The present invention relates to a printer and a print system, and particularly relates to a printer and a print system which set a limit to a place where a printer operation can be executed.

2. Description of the Related Art

These days, as a business model using a printer, a model, in which a printer manufacturer lends a printer to a user without charge and the user pays the printer manufacturer only usage fees proportional to the number of sheets the user printed with this printer, is attracting considerable attraction. In such a business model, in addition to a charge proportional to the number of printed sheets, a charge proportional to the period of use, a charge proportional to the amount of ink used, and the like are planned.

However, in the aforementioned business model, if the user sells the printer borrowed from the printer manufacturer without permission or lends the printer to another person, the printer manufacturer cannot charge for the use of the printer. Therefore, the printer manufacturer wants to limit a place where the lent printer can be used, that is, a place where a proper print operation can be executed to a place of the user to whom the printer is lent.

SUMMARY OF THE INVENTION

Hence, the present invention is made in view of the aforementioned problem, and an object of the present invention is to provide a printer and a print system capable of executing a proper print operation only in a place registered in advance.

In order to accomplish the aforementioned and other objects, according to one aspect of the present invention, a printer, comprises:

a printer position information acquisition which acquires printer position information to specify a place where the printer is installed;

a first printer position information acquisition which acquires printer position information from the printer position information acquisition and regards this printer position information as first printer position information;

a public key generator which generates a public key with a passphrase containing at least the first printer position information;

a public key storage in which the public key generated by the public key generator is stored, the number of times the public key is allowed to be stored being limited to a predetermined number of times;

a print data receiver which receives print data encrypted with the public key;

a second printer position information acquisition which acquires printer position information from the printer position information acquisition when the print data has been received and regards this printer position information as second printer position information;

a private key generator which generates a private key with a passphrase containing at least the second printer position information; and a decrypter which decrypts the print data received by the print data receiver with the private key.

According to another aspect of the present invention, a printer, comprises:

a printer position information acquisition which acquires printer position information to specify a place where the printer is installed;

a first printer position information acquisition which acquires printer position information from the printer position information acquisition and regards this printer position information as first printer position information;

a printer position information storage in which the first printer position information acquired by the first printer position information acquisition is stored, the number of times the first printer position information is allowed to be stored being limited to a predetermined number of times;

a public key generator which reads the first printer position information from the printer position information storage and generates a public key with a passphrase containing at least the first printer position information;

a print data receiver which receives print data encrypted with the public key;

a second printer position information acquisition which acquires printer position information from the printer position information acquisition when the print data has been received and regards this printer position information as second printer position information;

a private key generator which generates a private key with a passphrase containing at least the second printer position information; and a decrypter which decrypts the print data received by the print data receiver with the private key.

According to another aspect of the present invention, a printer, comprises:

a printer position information acquisition which acquires printer position information to specify a place where the printer is installed;

a first printer position information acquisition which acquires printer position information from the printer position information acquisition and regards this printer position information as first printer position information;

a printer position information storage in which the first printer position information acquired by the first printer position information acquisition is stored, the number of times the first printer position information is allowed to be stored being limited to a predetermined number of times;

a public key acquisition request receiver which receives a public key acquisition request to request acquisition of a public key;

a second printer position information acquisition which acquires printer position information from the printer position information acquisition when the public key acquisition receiver has received the public key acquisition request and regards this printer position information as second printer position information; and a public key generator which compares the first printer position information stored in the printer position information storage and the second printer position information acquired by the second printer position information acquisition, and which generates a public key with a passphrase containing at least the first printer position information or the second printer position information when the first printer position information and the second printer position information coincide.

According to another aspect of the present invention, a control method of a printer, comprises the steps of:

acquiring printer position information to specify a place where the printer is installed from a printer position information acquisition and regarding this printer position information as first printer position information;

generating a public key with a passphrase containing at least the first printer position information;

storing the generated public key in a public key storage, the number of times the public key is allowed to be stored being limited to a predetermined number of times;

receiving print data encrypted with the public key;

acquiring printer position information from the printer position information acquisition when the print data has been received and regarding this printer position information as second printer position information;

generating a private key with a passphrase containing at least the second printer position information; and decrypting the received print data with the private key.

According to another aspect of the present invention, a control method of a printer, comprises the steps of:

acquiring printer position information to specify a place where the printer is installed from a printer position information acquisition and regarding this printer position information as first printer position information;

storing the first printer position information in a printer position information storage, the number of times the first printer position information is allowed to be stored being limited to a predetermined number of times;

reading the first printer position information from the printer position information storage and generating a public key with a passphrase containing at least the first printer position information;

receiving print data encrypted with the public key;

acquiring printer position information from the printer position information acquisition when the print data has been received and regarding this printer position information as second printer position information;

generating a private key with a passphrase containing at least the second printer position information; and decrypting the received print data with the private key.

According to another aspect of the present invention, a control method of a printer, comprises the steps of:

acquiring printer position information to specify a place where the printer is installed from a printer position information acquisition and regarding this printer position information as first printer position information;

storing the first printer position information in a printer position information storage, the number of times the first printer position information is allowed to be stored being limited to a predetermined number of times;

receiving a public key acquisition request to request acquisition of a public key;

acquiring printer position information from the printer position information acquisition when the public key acquisition request has been received and regarding this printer position information as second printer position information; and comparing the first printer position information stored in the printer position information storage and the acquired second printer position information, and generating a public key with a passphrase containing at least the first printer position information or the second printer position information when the first printer position information and the second printer position information coincide.

According to another aspect of the present invention, a print system includes a printer and a print client, wherein the printer comprises:

a printer position information acquisition which acquires printer position information to specify a place where the printer is installed;

a first printer position information acquisition which acquires printer position information from the printer position information acquisition and regards this printer position information as first printer position information;

a public key generator which generates a public key with a passphrase containing at least the first printer position information; and a public key storage in which the public key generated by the public key generator is stored, the number of times the public key is allowed to be stored being limited to a predetermined number of times, the print client comprises:

a print data generator which generates print data to be printed by the printer; and a print data transmitter which encrypts the print data with the public key and transmits the encrypted print data to the printer, and the printer further comprises:

a print data receiver which receives the print data;

a second printer position information acquisition which acquires printer position information from the printer position information acquisition when the print data has been received and regards this printer position information as second printer position information;

a private key generator which generates a private key with a passphrase containing at least the second printer position information; and a decrypter which decrypts the print data received by the print data receiver with the private key.

According to another aspect of the present invention, a print system includes a printer and a print client, wherein the printer comprises:

a printer position information acquisition which acquires printer position information to specify a place where the printer is installed;

a first printer position information acquisition which acquires printer position information from the printer position information acquisition and regards this printer position information as first printer position information;

a printer position information storage in which the first printer position information acquired by the first printer position information acquisition is stored, the number of times the first printer position information is allowed to be stored being limited to a predetermined number of times; and a public key generator which reads the first printer position information from the printer position information storage and generates a public key with a passphrase containing at least the first printer position information, the print client comprises:

a print data generator which generates print data to be printed by the printer; and a print data transmitter which encrypts the print data with the public key and transmits the encrypted print data to the printer, and the printer further comprises:

a print data receiver which receives the print data;

a second printer position information acquisition which acquires printer position information from the printer position information acquisition when the print data has been received and regards this printer position information as second printer position information;

a private key generator which generates a private key with a passphrase containing at least the second printer position information; and a decrypter which decrypts the print data received by the print data receiver with the private key.

According to another aspect of the present invention, a print system includes a printer and a print client, wherein the printer comprises:

a printer position information acquisition which acquires printer position information to specify a place where the printer is installed;

a first printer position information acquisition which acquires printer position information from the printer position information acquisition and regards this printer position information as first printer position information; and a printer position information storage in which the first printer position information acquired by the first printer position information acquisition is stored, the number of times the first printer position information is allowed to be stored being limited to a predetermined number of times, the print client comprises:

a public key acquisition request transmitter which transmits a public key acquisition request to request acquisition of a public key, and the printer further comprises:

a public key acquisition request receiver which receives the public key acquisition request;

a second printer position information acquisition which acquires printer position information from the printer position information acquisition when the public key acquisition receiver has received the public key acquisition request and regards this printer position information as second printer position information; and a public key generator which compares the first printer position information stored in the printer position information storage and the second printer position information acquired by the second printer position information acquisition, and generates a public key with a passphrase containing at least the first printer position information or the second printer position information when the first printer position information and the second printer position information coincide.

According to another aspect of the present invention, a printer, comprises:

a printer position information acquisition which acquires printer position information to specify a place where the printer is installed;

a public key generator which acquires printer position information from the printer position information acquisition, regards this printer position information as first printer position information, and generates a public key with a passphrase containing at least the first printer position information, when a person with proper authority makes a request;

a public key storage in which the public key generated by the public key generator is stored;

a print data receiver which receives print data encrypted with the public key;

a second printer position information acquisition which acquires printer position information from the printer position information acquisition when the print data has been received and regards this printer position information as second printer position information;

a private key generator which generates a private key with a passphrase containing at least the second printer position information; and a decrypter which decrypts the print data received by the print data receiver with the private key.

According to another aspect of the present invention, a printer, comprises:

a printer position information acquisition which acquires printer position information to specify a place where the printer is installed;

a first printer position information acquisition and storage which acquires printer position information from the printer position information acquisition, regards this printer position information as first printer position information, and stores the first printer position information in a printer position information storage, when a person with proper authority makes a request;

a public key generator which reads the first printer position information from the printer position information storage and generates a public key with a passphrase containing at least the first printer position information;

a print data receiver which receives print data encrypted with the public key;

a second printer position information acquisition which acquires printer position information from the printer position information acquisition when the print data has been received and regards this printer position information as second printer position information;

a private key generator which generates a private key with a passphrase containing at least the second printer position information; and a decrypter which decrypts the print data received by the print data receiver with the private key.

According to another aspect of the present invention, a printer, comprises:

a printer position information acquisition which acquires printer position information to specify a place where the printer is installed;

a first printer position information acquisition and storage which acquires printer position information from the printer position information acquisition, regards this printer position information as first printer position information, and stores the first printer position information in a printer position information storage, when a person with proper authority makes a request;

a public key acquisition request receiver which receives a public key acquisition request to request acquisition of a public key;

a second printer position information acquisition which acquires printer position information from the printer position information acquisition when the public key acquisition receiver has received the public key acquisition request and regards this printer position information as second printer position information; and a public key generator which compares the first printer position information stored in the printer position information storage and the second printer position information acquired by the second printer position information acquisition, and generates a public key with a passphrase containing at least the first printer position information or the second printer position information when the first printer position information and the second printer position information coincide.

According to another aspect of the present invention, a control method of a printer, comprises the steps of:

acquiring printer position information to specify a place where the printer is installed from a printer position information acquisition, regarding this printer position information as first printer position information, and generating a public key with a passphrase containing at least the first printer position information, when a person with proper authority makes a request;

storing the generated public key in a public key storage;

receiving print data encrypted with the public key;

acquiring printer position information from the printer position information acquisition when the print data has been received and regarding this printer position information as second printer position information;

generating a private key with a passphrase containing at least the second printer position information; and decrypting the received print data with the private key.

According to another aspect of the present invention, a control method of a printer, comprises the steps of:

acquiring printer position information from a printer position information acquisition to specify a place where the printer is installed, regarding this printer position information as first printer position information, and storing the first printer position information in a printer position information storage, when a person with proper authority makes a request;

reading the first printer position information from the printer position information storage and generating a public key with a passphrase containing at least the first printer position information;

receiving print data encrypted with the public key;

acquiring printer position information from the printer position information acquisition when the print data has been received and regarding this printer position information as second printer position information;

generating a private key with a passphrase containing at least the second printer position information; and decrypting the received print data with the private key.

According to another aspect of the present invention, a control method of a printer, comprises the steps of:

acquiring printer position information to specify a place where the printer is installed from a printer position information acquisition, regarding this printer position information as first printer position information, and storing the first printer position information in a printer position information storage, when a person with proper authority makes a request;

receiving a public key acquisition request to request acquisition of a public key;

acquiring printer position information from the printer position information acquisition when the public key acquisition request has been received and regarding this printer position information as second printer position information; and comparing the first printer position information stored in the printer position information storage and the acquired second printer position information, and generating a public key with a passphrase containing at least the first printer position information or the second printer position information when the first printer position information and the second printer position information coincide.

According to another aspect of the present invention, a print system includes a printer and a print client, wherein the printer comprises:

a printer position information acquisition which acquires printer position information to specify a place where the printer is installed;

a public key generator which acquires printer position information from the printer position information acquisition, regards this printer position information as first printer position information, and generates a public key with a passphrase containing at least the first printer position information, when a person with proper authority makes a request; and a public key storage in which the public key generated by the public key generator is stored, the print client comprises:

a print data generator which generates print data to be printed by the printer; and a print data transmitter which encrypts the print data with the public key and transmits the encrypted print data to the printer, and the printer further comprises:

a print data receiver which receives the print data encrypted with the public key;

a second printer position information acquisition which acquires printer position information from the printer position information acquisition when the print data has been received and regards this printer position information as second printer position information;

a private key generator which generates a private key with a passphrase containing at least the second printer position information; and a decrypter which decrypts the print data received by the print data receiver with the private key.

According to another aspect of the present invention, a print system includes a printer and a print client, wherein the printer comprises:

a printer position information acquisition which acquires printer position information to specify a place where the printer is installed;

a first printer position information acquisition and storage which acquires printer position information from the printer position information acquisition, regards this printer position information as first printer position information, and stores the first printer position information in a printer position information storage, when a person with proper authority makes a request; and a public key generator which reads the first printer position information from the printer position information storage and generates a public key with a passphrase containing at least the first printer position information, the print client comprises:

a print data generator which generates print data to be printed by the printer; and a print data transmitter which encrypts the print data with the public key and transmits the encrypted print data to the printer, and the printer further comprises:

a print data receiver which receives print data encrypted with the public key;

a second printer position information acquisition which acquires printer position information from the printer position information acquisition when the print data has been received and regards this printer position information as second printer position information;

a private key generator which generates a private key with a passphrase containing at least the second printer position information; and a decrypter which decrypts the print data received by the print data receiver with the private key.

According to another aspect of the present invention, a print system includes a printer and a print client, wherein the printer comprises:

a printer position information acquisition which acquires printer position information to specify a place where the printer is installed; and a first printer position information acquisition and storage which acquires printer position information from the printer position information acquisition, regards this printer position information as first printer position information, and stores the first printer position information in a printer position information storage, when a person with proper authority makes a request, the print client comprises:

a public key acquisition request transmitter which transmits a public key acquisition request to request acquisition of a public key, and the printer further comprises:

a public key acquisition request receiver which receives the public key acquisition request;

a second printer position information acquisition which acquires printer position information from the printer position information acquisition when the public key acquisition receiver has received the public key acquisition request and regards this printer position information as second printer position information; and a public key generator which compares the first printer position information stored in the printer position information storage and the second printer position information acquired by the second printer position information acquisition, and generates a public key with a passphrase containing at least the first printer position information or the second printer position information when the first printer position information and the second printer position information coincide.

BRIEF DESCRIPTION OF THE DRAWINGS

FIG. 8 is a diagram showing an example of the structure of a public key table included in the print client according to the first embodiment of the present invention;

DETAILED DESCRIPTION OF THE EMBODIMENTS

[First Embodiment]

In a print system according to the first embodiment, a public key is generated with a passphrase containing at least printer position information which indicates a position where a printer is installed at this point in time, and the public key is stored in the printer. When transmission of a public key is requested by a print client, the printer reads the stored public key and transmits this public key to the print client. When the print client transmits print data to this printer, the print client transmits print transmitting data generated by encrypting the print data with the acquired public key. The printer which has received this print transmitting data generates, at the time of reception, a private key with a passphrase containing at least printer position information at this point in time, and executes a print operation only when the print transmitting data can be decrypted with this private key. In addition, by limiting the number of times of registration of the public key with the printer to one time, a proper print operation can be executed only in a place where the public key is registered with the printer. Further details will be given below.

Figure 1:
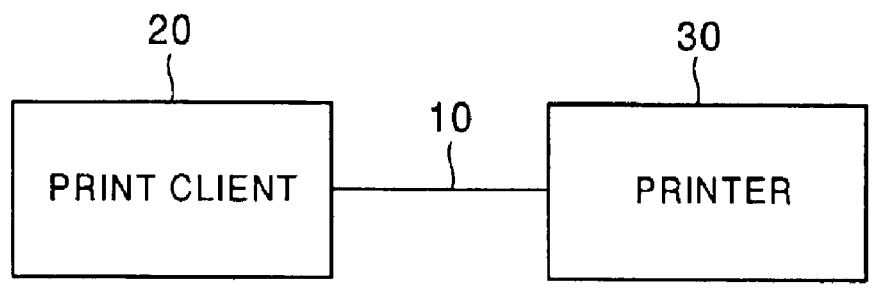
FIG. 1 is a diagram showing an example of the configuration of a print system according to a first embodiment of the present invention.

First, the configuration of the print system according to this embodiment will be explained based on FIG. 1. FIG. 1 is a block diagram showing the hardware configuration of the print system according to this embodiment.

As shown in FIG. 1, the print system according to this embodiment includes a print client 20 and a printer 30 which are connected by a printer cable 10. Namely, the printer 30 is locally connected to the print client 20. However, the print client 20 and the printer 20 may be connected by wireless or by a network using Ethernet or the like. In this case, plural print clients 20 may be connected to one printer 30.

The print client 20 is composed of any of various kinds of computers, for example, called a host computer and a personal computer. In this embodiment, in particular, the print client 20 generates print transmitting data by encrypting print data with a public key and transmits this print transmitting data to the printer 30 via the printer cable 10. The print client 20 is not limited to a computer, and, for example, it may be a digital camera with a necessity to print a taken image, a content server in which print image data is stored as contents, or the like.

Further, in this embodiment, the printer 30 is a printer capable of generating a public key by public key cryptography only one time. The generated public key is stored and held in the printer 30. The printer 30 receives the print transmitting data from the print client 20 and decrypts this print transmitting data with a private key generated with a passphrase containing at least printer position information at this point in time. When the print transmitting data can be decrypted, the printer 30 executes a print operation based on the print transmitting data, and when the print transmitting data cannot be decrypted, the printer 30 does not execute the print operation based on the print transmitting data.

Furthermore, in this embodiment, the printer 30 is designed so as not to obtain a proper print result from print data which is not encrypted with the public key. More specifically, the printer 30 treats the unencrypted print data as print transmitting data which cannot be decrypted with the private key.

Figure 2:
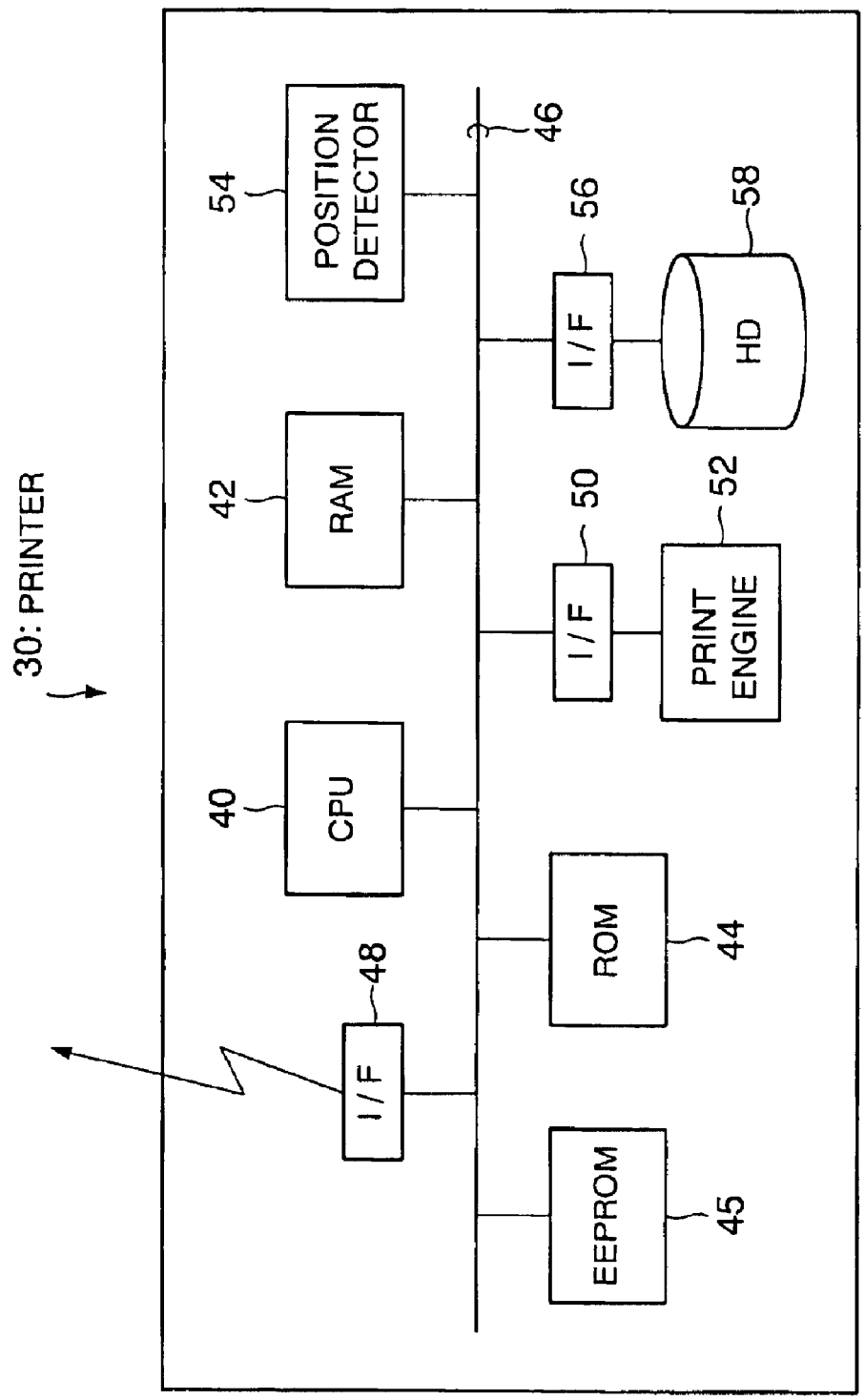
FIG. 2 is a diagram showing an example of the hardware configuration of a printer according to the first embodiment of the present invention.

FIG. 2 is a block diagram explaining the internal configuration of the printer 30. As shown in FIG. 2, the printer 30 includes a CPU (Central Processing Unit) 40, a RAM (Random Access Memory) 42, a ROM (Read Only Memory) 44, and an EEPROM (Electrically Erasable Programmable ROM) 45, and they are connected to one another via an internal bus 46. A communication interface 48 is connected to the internal bus 46, and the printer 30 is connected to the aforementioned printer cable 10 via the communication interface 48. In addition, an interface 50 is connected to the internal bus 46, and a print engine 52 is connected to the interface 50. In this embodiment, the EEPROM 45 functions as a rewritable nonvolatile memory device.

Moreover, a position detector 54 is connected to the internal bus 46. This position detector 54 has a function of specifying a position where the printer 30 is installed. In this embodiment, the position detector 54 is constituted, for example, by a GPS (global positioning system), and the latitude, longitude, and altitude of the position where the printer 30 is installed can be specified. It is said that the accuracy of the GPS at the present time is approximately ±10 m in the latitude, the longitude, and the altitude, respectively.

However, the constitution of the position detector 54 is not limited to the constitution using the GPS, and, for example, the position of the printer 30 may be specified by using mobile communication technology including the PHS (Personal Handyphone System).

Furthermore, a hard disk 58 is connected to the internal bus 46 via an interface 56. In this embodiment, the hard disk 58 functions as a rewritable nonvolatile memory device.

Figure 3:
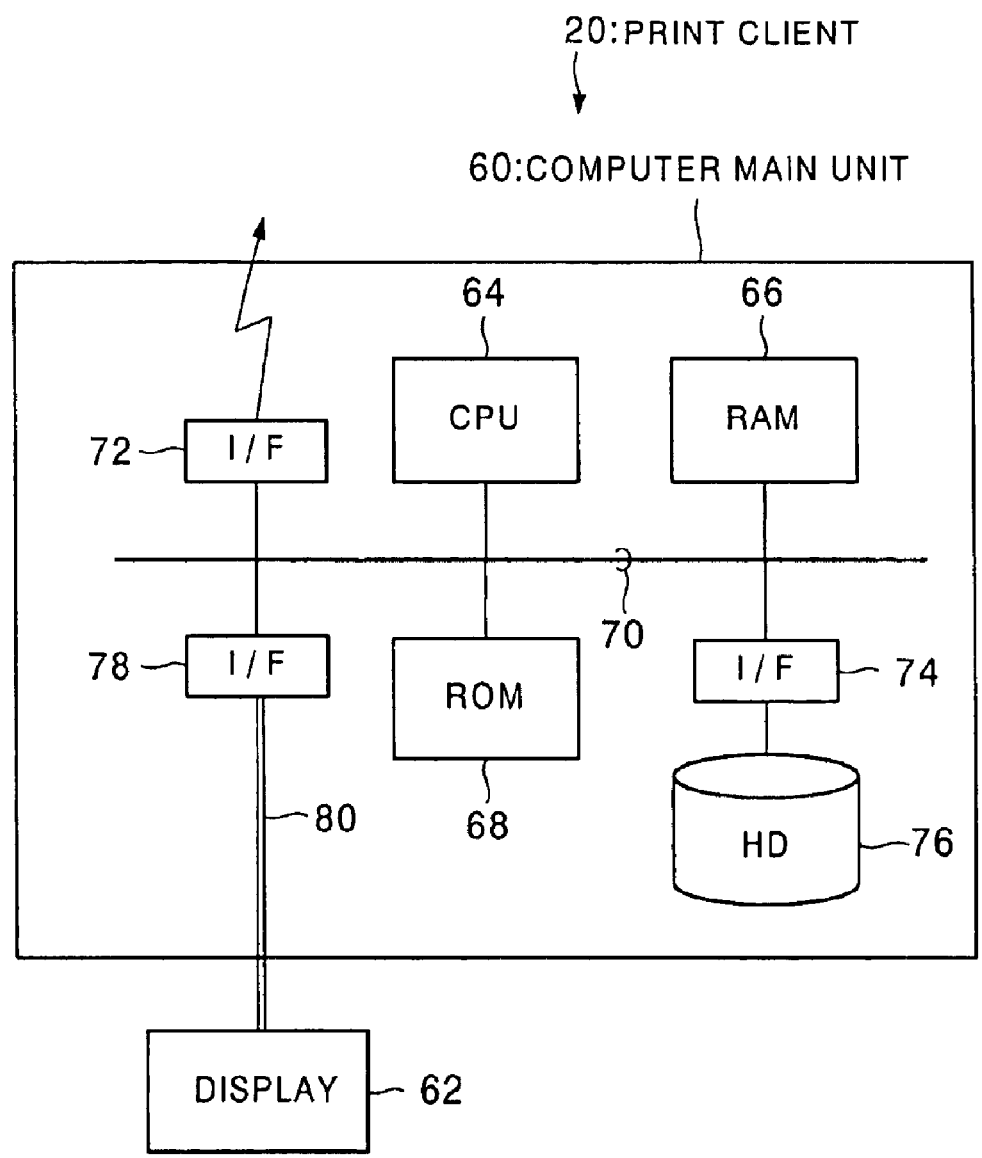
FIG. 3 is a diagram showing an example of the configuration of a print client according to the first embodiment of the present invention.

FIG. 3 is a block diagram explaining the internal configuration of the print client 20. As shown in FIG. 3, the print client 20 according to this embodiment includes a computer main unit 60 and a display 62.

The computer main unit 60 includes a CPU 64, a RAM 66, and a ROM 68, and they are connected to one another via an internal bus 70. A communication interface 72 is connected to the internal bus 70, and the print client 20 is connected to the aforementioned printer cable 10 via the communication interface 72.

In addition, an interface 74 is connected to the internal bus 70, and a hard disk 76 which is a large capacity storage is connected to the interface 74. In this embodiment, the hard disk 76 functions as a rewritable nonvolatile memory device. Moreover, an interface 78 is connected to the internal bus 70, and the aforementioned display 62 is connected via a cable 80 which extends from the interface 78.

Next, a brief explanation of a process when the print client 20 performs printing with the printer 30 in the print system according to this embodiment will be given.

In this embodiment, in the printer 30, a public key is previously generated and stored in the EEPROM 45. The printer 30 generates this public key with a passphrase containing at least printer position information which indicates a position where the printer 30 is installed by the public key cryptography. Note that, at this time, a private key is not generated or is abandoned even if generated. When the printer 30 accepts a public key acquisition request from the print client 20, the printer 30 reads this public key from the EEPROM 45 and transmits this public key to the print client 20 via the printer cable 10.

However, the printer 30 need not necessarily notify the print client 20 of the public key of the printer 30 via the printer cable 10. For example, if a user of the print client 20 has proper authority, the user can operate the printer 30, whereby it is also possible that the user operates a control panel of the printer 30 and acquires the public key of the printer 30. In this case, the user may record the public key of the printer 30 on a record medium such as a flexible disk and allow the print client 20 to read this public key.

Figure 4:
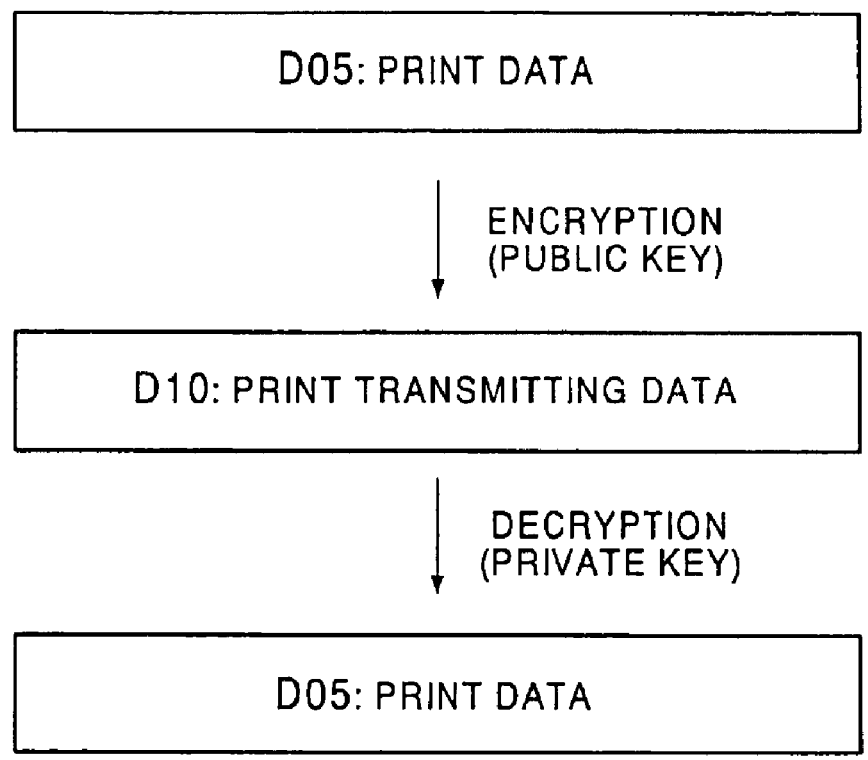
FIG. 4 is a conceptual diagram explaining encryption and decryption of print data with a public key and a private key in the first embodiment of present invention.

Then, as shown in FIG. 4, the user of the print client 20 generates print data D05 which is data to be printed and designates the printer 30 for the print client 20 to execute a print operation.

The print client 20 encrypts the print data D05 with the public key of the printer 30, which is previously acquired, to generate print transmitting data D10. Here, the print data D05 means original print data needed for a print operation executed by driving the print engine 52 in the printer 30. Incidentally, the print transmitting data D10 may contain data other than the print data D05 shown in FIG. 4.

The printer 30 which has received the print transmitting data D10 temporarily stores the received print transmitting data D10 in the RAM 42 as shown in FIG. 2. The printer 30 then decrypts the encrypted print transmitting data D10 with a private key. More specifically, the printer 30 generates the private key with a passphrase containing at least printer position information at this point in time by the public key cryptography. By thus generating the private key every time the decryption of the print transmitting data D10 is tried, when the installation place of the printer 30 is moved, the print transmitting data encrypted with the public key generated before the movement cannot be decrypted by the printer 30 after the movement.

Subsequently, the printer 30 judges whether the print transmitting data D10 can be decrypted. When the print transmitting data D10 can be decrypted, the printer 30 executes a print operation based on the print data D05 acquired by decrypting the print transmitting data D10, and when the print transmitting data D10 cannot be decrypted, the printer 30 does not execute the print operation.

Figure 5:
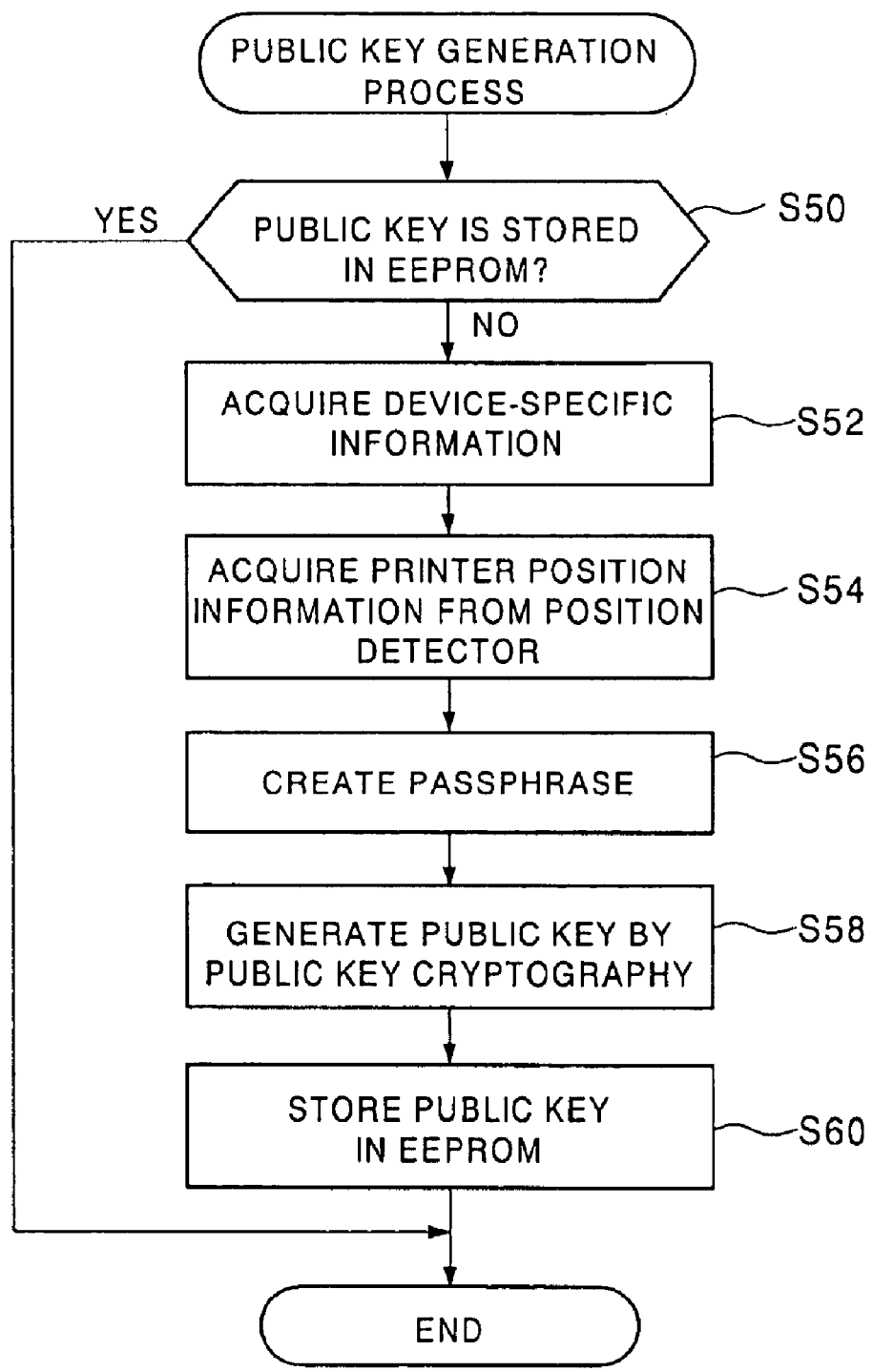
FIG. 5 is a flowchart explaining a public key generation process executed by the printer according to the first embodiment of the present invention.

Next, the contents of the aforementioned process will be explained in detail using a flowchart. FIG. 5 is a flowchart explaining a public key generation process executed by the printer 30. This public key generation process is realized by making the CPU 40 read and execute a public key generation program stored in the ROM 44 or the hard disk 58 in the printer 30. Moreover, in this embodiment, this public key generation process is activated and executed when the user operates the control panel of the printer 30 to thereby instruct the execution of the public key generation process.

As shown in FIG. 5, when the public key generation process is executed, the printer 30 first judges whether a public key is already stored in the EEPROM 45 (step S50). When the public key is already stored in the EEPROM 45 (step S50: Yes), this public key generation process is completed without a new public key being generated.

On the other hand, when any public key is not yet stored in the EEPROM 45 (step S50: No), the printer 30 acquires device-specific information on this printer 30(step S52). Here, the device-specific information is identification information specifically assigned to the printer 30, and it is, for example, a manufacturer's serial number, an MAC address, or the like of the printer 30.

Then, the printer 30 acquires printer position information on the printer 30 at this point in time from the position detector (step S54). Thereby, the printer 30 can acquire information on the installation position of the printer 30 at this point in time.

Subsequently, the printer 30 creates a passphrase with the device-specific information and the printer position information (step S56). There are various methods of creating the passphrase. In this embodiment, the passphrase is created by simply joining the printer position information after the device-specific information. Incidentally, the passphrase may contain data other than these device-specific information and printer position information.

Figure 6:
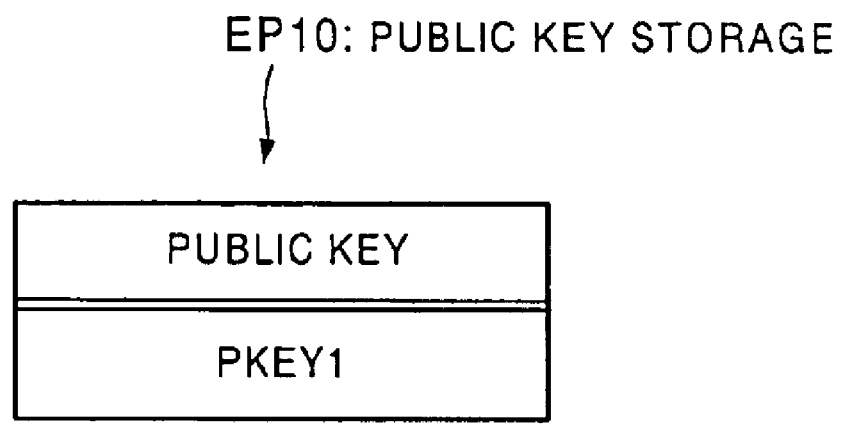
FIG. 6 is a diagram showing the structure of a public key storage formed in an EEPROM of the printer according to the first embodiment of the present invention.

Thereafter, the printer 30 generates a public key with the passphrase created in step S56 by the public key cryptography (step S58). Then, the printer 30 stores the generated public key in the EEPROM 45 (step S60). FIG. 6 is a diagram showing the structure of a public key storage EP10 formed in a partial region of the EEPROM 45. As shown in FIG. 6, the generated public key is stored and held in the public key storage EP10. Note that when a private key is also generated when the public key is generated, this private key is abandoned without being stored.

Thus, the public key generation process according to this embodiment is completed.

Next, processes in the print client 20 and the printer 30 when the print client 20 acquires a public key will be explained.

Figure 7:
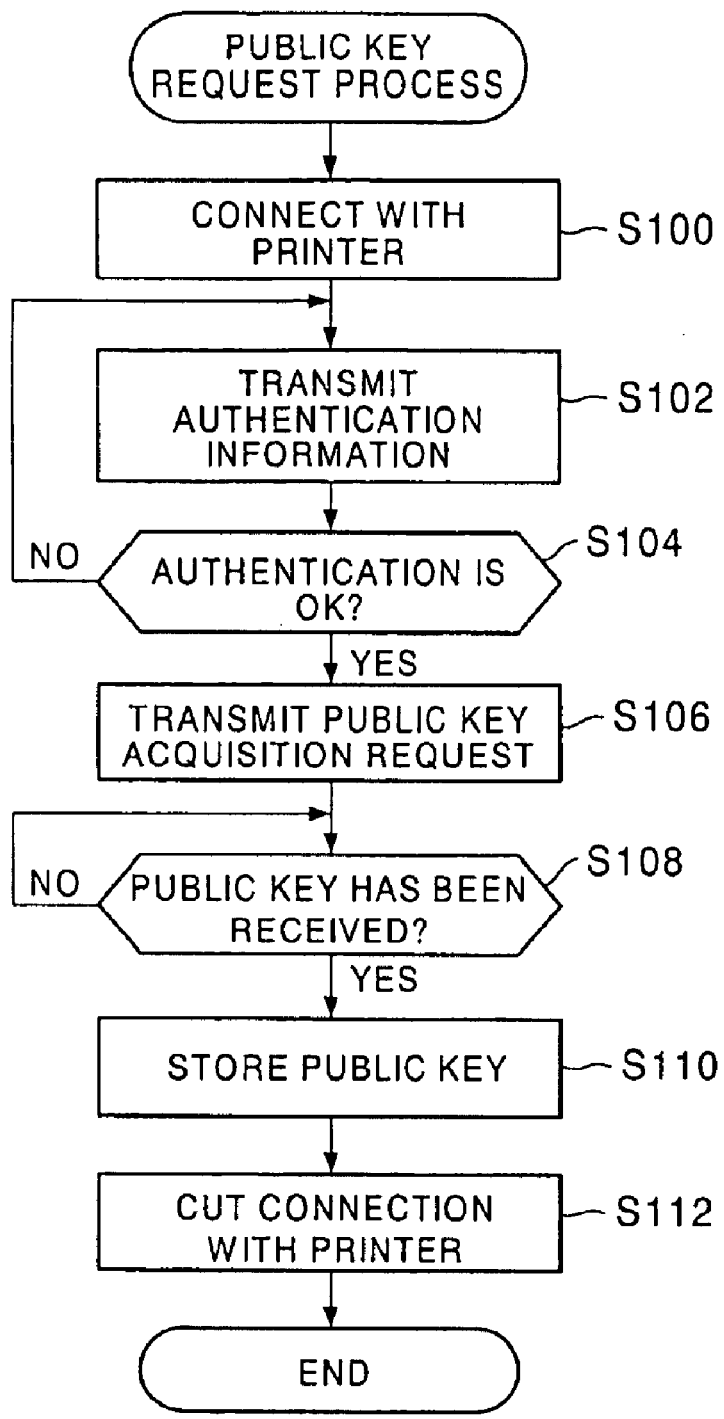
FIG. 7 is a flowchart explaining a public key request process executed by the print client according to the first embodiment of the present invention.

FIG. 7 is a flowchart explaining a public key request process executed by the print client 20. This public key request process is realized by making the CPU 64 read and execute a public key request program stored in the ROM 68 or the hard disk 76 in the print client. Moreover, in this embodiment, the public key request process is activated and executed when the user makes input to instruct the print client to activate a process of requesting a public key.

As shown in FIG. 7, in the public key request process, the print client 20 first establishes a connection with the printer 30 (step S100). Subsequently, the print client 20 transmits authentication information to the printer 30 (step S102). In this embodiment, a combination of a print client ID to specify the print client and a password is used as the authentication information. Accordingly, the print client 20 transmits the print client ID and the password to the printer 30.

Following the above step, the print client 20 receives an authentication result indicating whether authentication is accepted from the printer 30, and judges whether the authentication is accepted by the printer 30 based on the authentication result (step S104). When the authentication is not accepted (step S104: No), the print client 20 repeats the aforementioned process from step S102.

On the other hand, when the authentication is accepted (step S104: Yes), the print client 20 transmits a public key acquisition request to the printer 30 (step S106). Then, the print client 20 judges whether a public key has been received from the printer 30 (step S108). When the public key has not been received from the printer 30 (step S108: No), the print client 20 stands by while repeating step S108.

On the other hand, when the public key has been received from the printer 30 (step S108: Yes), the public key is stored (step S110). In this embodiment, the print client 20 is provided with a public key table TB10 on the hard disk 76, and the acquired public key is stored and held in this public key table TB10.

Figure 9:
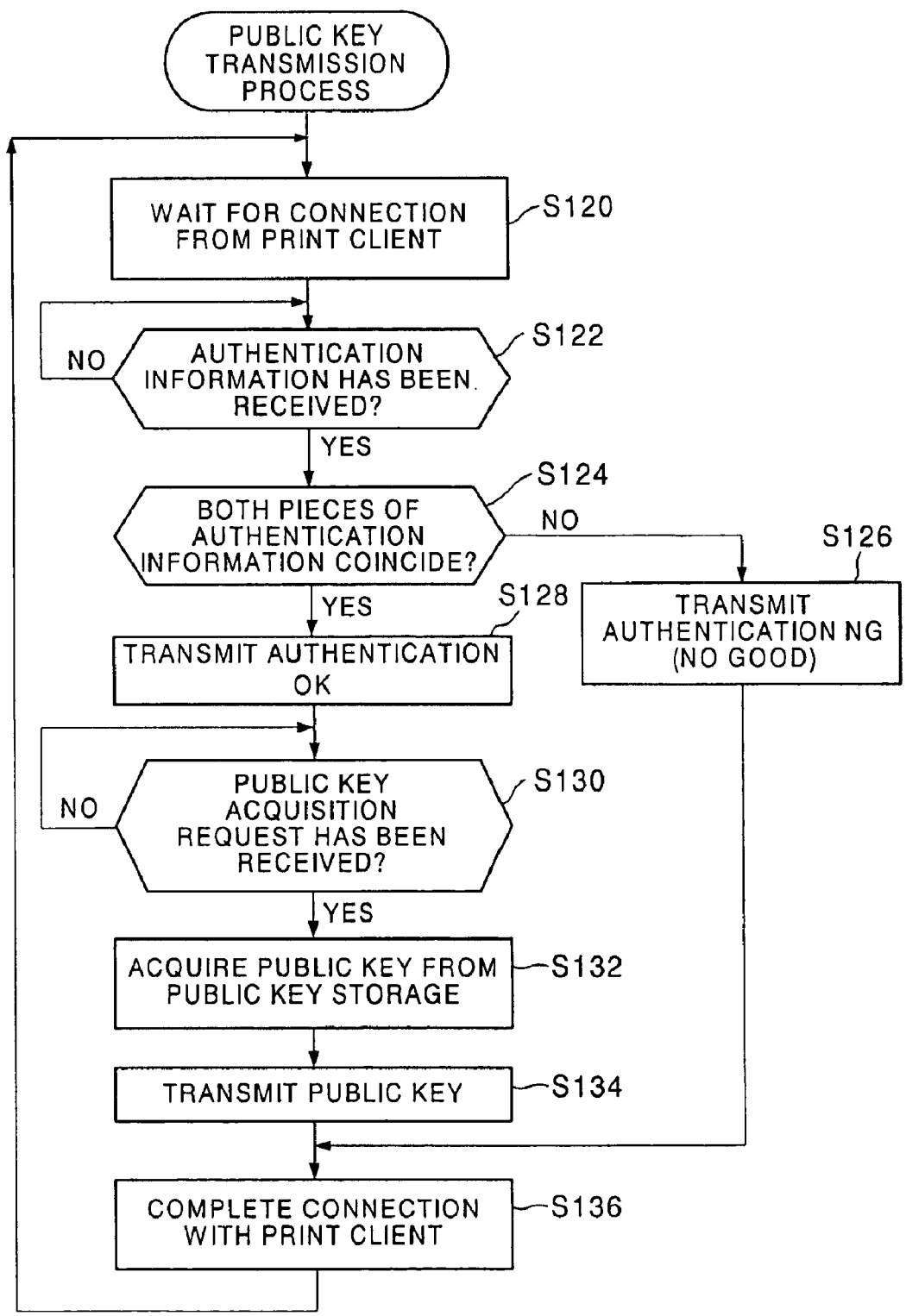
FIG. 9 is a part of a flowchart explaining a public key transmission process executed by the printer according to the first embodiment of the present invention.

FIG. 8 is a diagram showing an example of the structure of the public key table TB10. As shown in FIG. 8, the public key table TB10 includes an item TD10 which stores information to specify printers and an item TD11 which stores acquired public keys corresponding to the printers. As described just above, the public key table TB10 can hold public keys concerning plural printers on a printer-by-printer basis. Moreover, by storing the public keys in the public key table TB10 on the hard disk 76 in this manner, even when the print client 20 is powered off and then powered on again, the public key acquired before the power-on can be read from the hard disk 76 and used as it is. As shown in FIG. 7, the print client 20 then cuts the connection with the printer 30 (step S112). Thus, the public key request process shown in FIG. 7 is completed. Next, a public key transmission process executed by the printer 30 corresponding to the public key request process in the print client 20 will be explained based on FIG. 9. FIG. 9 is a flowchart explaining the public key transmission process executed by the printer 30. This public key transmission process is realized by making the CPU 40 read and execute a public key transmission program stored in the ROM 44 or the hard disk 58 in the printer. In this embodiment, this public key transmission process is constantly executed at regular time intervals. Moreover, this public key transmission process is a process corresponding to the aforementioned public key request process.

As shown in FIG. 9, the printer 30 is waiting for a connection from the print client 20, and establishes a connection with the print client 20 when the print client 20 makes a request for the connection (step S120). This corresponds to the aforementioned step S100 on the print client 20 side. Subsequently, the printer 30 judges whether the authentication information has been received from the print client 20 (step S122). When the authentication information has not been received (step S122: No), the printer 30 stands by while repeating the process in step S122.

On the other hand, when the authentication information has been received from the print client 20 (step S122: Yes), the printer 30 judges whether this authentication information coincides with authentication information which is previously registered with the printer 30 (step S124). Specifically, since the print client ID and the password are transmitted as the authentication information from the print client 20 as described above, the printer 30 judges whether these print client ID and password coincide with a print client ID and a password which are previously registered with the printer 30.

When these two pieces of authentication information do not coincide (step S124: No), the printer 30 transmits the authentication result indicating that the authentication is not accepted to the print client 20 (step S126), and the connection with the print client 20 is completed in later-described step S136. On the other hand, when these two pieces of authentication information coincide (step S124: Yes), the printer 30 transmits the authentication result indicating that the authentication is accepted to the print client 20 (step S128).

Thereafter, the printer 30 judges whether the public key acquisition request has been received from the print client 20 (step S130). When the public key acquisition request has not been received (step S130: No), the printer 30 stands by while repeating the process in step S130.

When the public key acquisition request has been received (step S130: Yes), the printer 30 reads and acquires the public key from the public key storage EP10 in the EEPROM 45 (step S132). Then, the printer 30 transmits the acquired public key to the print client 20 (step S134). Thereafter, the printer 30 completes the connection with the print client 20 (step S136) and returns to the aforementioned step S120.

Next, processes in the print client 20 and the printer 30 when the print client 20 wants to perform printing and transmits a print request to the printer 30 will be explained in detail.

Figure 10:
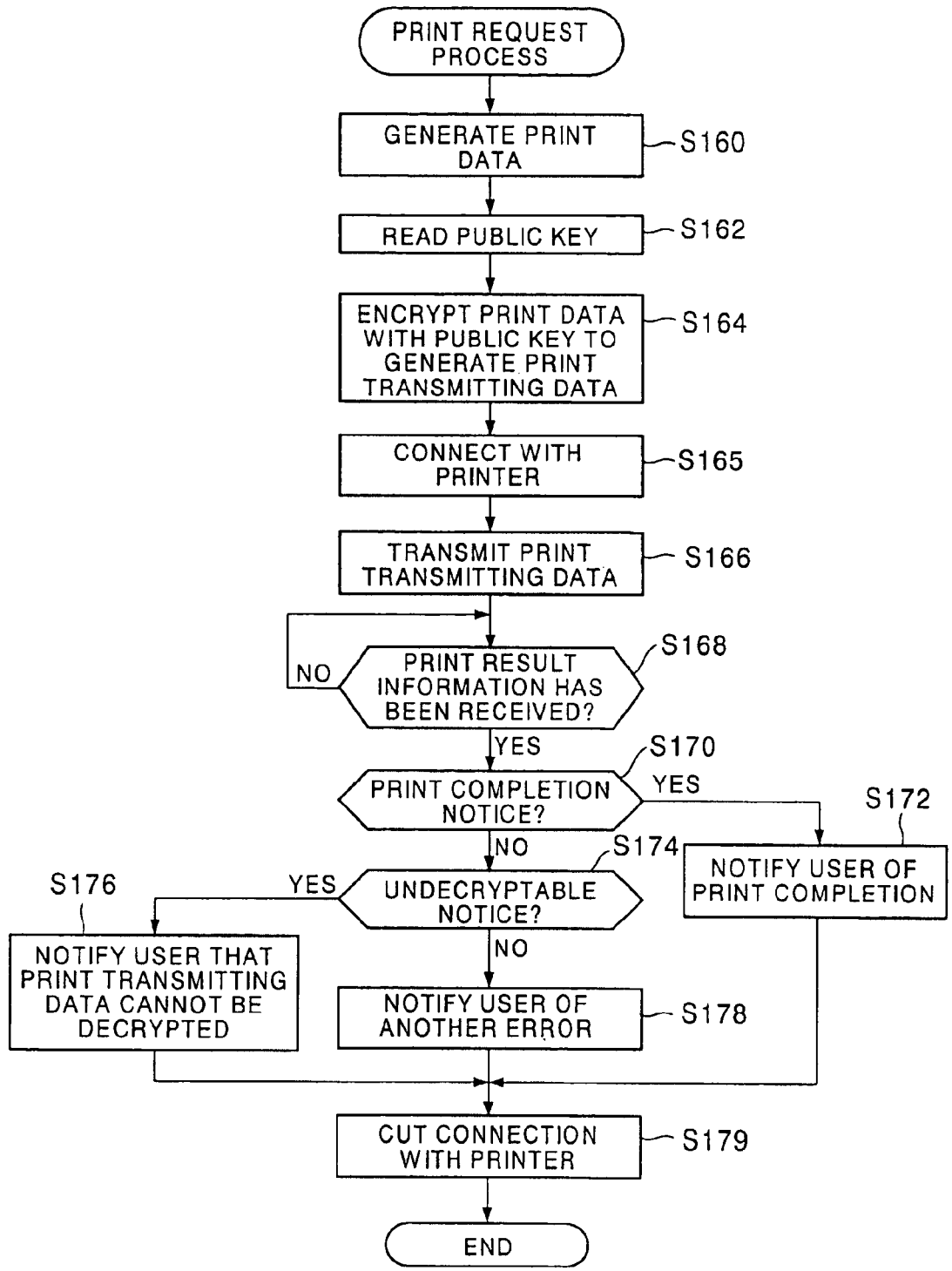
FIG. 10 is a flowchart explaining a print request process executed by the print client according to the first embodiment of the present invention.

FIG. 10 is a flowchart explaining a print request process executed by the print client 20. This print request process is realized by making the CPU 64 read and execute a print request program stored in the ROM 68 or the hard disk 76 of the print client. The print request process is activated and executed when the user inputs a print instruction to the print client.

As shown in FIG. 10, the print client 20 generates the print data D05 based on a print request from the user (step S160). The print data D05 is data necessary for an actual print operation when the printer 30 is an ordinary printer.

Then, the print client 20 reads the public key of the printer 30 from the public key table TB10 on the hard disk 76 (step S162). Subsequently, the print client 20 encrypts the print data D05 with the public key of the printer 30 to generate the print transmitting data D10 (step S164). Incidentally, the print transmitting data D10 may contain data other than the print data.

Thereafter, the print client 20 establishes a connection with the printer 30(step S165). The print client 20 then transmits the encrypted print transmitting data D10 to the printer 30 (step S166).

Subsequently, the print client 20 judges whether print result information has been received from the printer 30 (step S168). When the print result information has not been received (step S168: No), the print client 20 stands by while repeating the process in step S168. On the other hand, when the print result information has been received (step S168: Yes), the print client 20 judges whether the print result information is a print completion notice (step S170).

When this print result information is the print completion notice (step S170: Yes), it means that the printer 30 has properly completed the print operation, and hence the print client 20 notifies the user that the printer 30 has completed the print operation (step S172). On the other hand, when the received print result information is not the print completion notice (step S170: No), whether the print result information is an undecryptable notice is judged (step S174).

When the print result information is the undecryptable notice (step S174: Yes), the print client 20 notifies the user that since the print transmitting data D10 cannot be decrypted by the printer 30, the print operation is not executed (step S176). On the other hand, when the print result information is not the undecryptable notice (step S174: No), it is thought that some other error occurs, and hence the print client 20 gives notice according to the type of the error to the user (step S178).

After the notice in step S172, step S176, or step S178, the print client 20 cuts the connection with the printer 30 (step S179). Thus, the print request process in the print client 20 is completed.

Figure 11A:
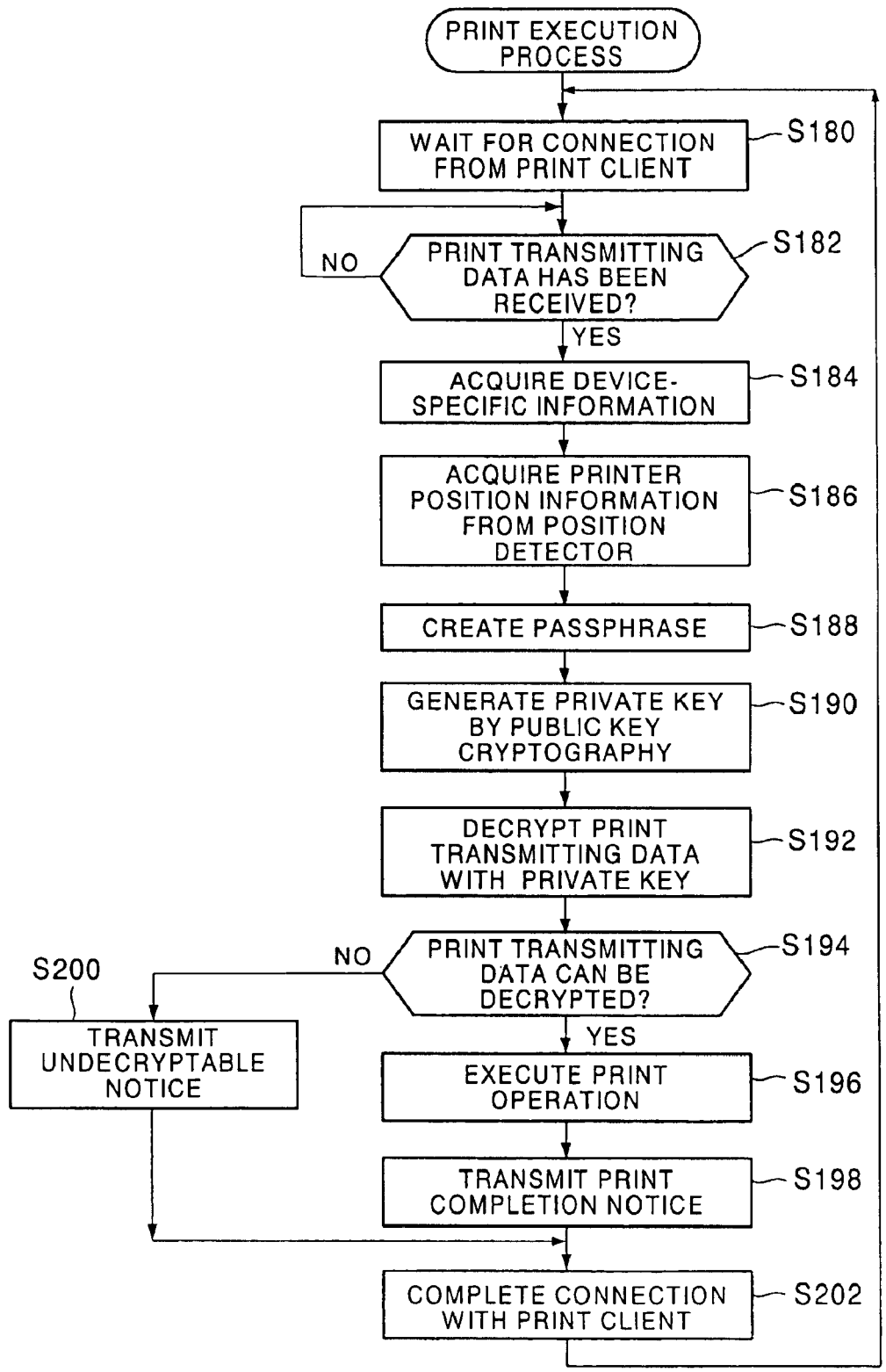
FIG. 11A is a flowchart explaining a print execution process executed by the printer according to the first embodiment of the present invention.

Next, a print execution process executed by the printer 30 corresponding to the print request process in the print client 20 will be explained based on FIG. 11A. FIG. 11A is a flowchart explaining the print execution process executed by the printer 30. This print execution process is realized by making the CPU 40 read and execute a print execution program stored in the ROM 44 or the hard disk 58 in the printer 30. In this embodiment, this print execution process is constantly executed at regular time intervals.

As shown in FIG. 11A, the printer 30 is waiting for a connection from the print client 20, and establishes a connection with the print client 20 via the printer cable 10 when the print client 20 makes a request for a connection (step S180). After the connection with the print client 20 has been established, the printer 30 judges whether the print transmitting data D10 has been received (step S182). When no print transmitting data D10 has been received (step S182: No), the printer 30 stands by while repeating the process in step S182.

On the other hand, when the print transmitting data D10 has been received (step S182: Yes), the printer 30 acquires its own device-specific information (step S184). Subsequently, the printer 30 acquires printer position information on the printer 30 at this point in time from the position detector 54 (step 186). The reason why the printer position information is acquired from the position detector 54 each time as described above is in order that, when the printer 30 is moved to a different place from a place where the public key was registered, a print operation cannot be executed by the printer 30.

Then, the printer 30 creates a passphrase with the device-specific information and the printer position information (step S188). This method of creating the passphrase needs to be the same method as in step S56 in the aforementioned public key generation process. This is because if the passphrases are different, a private key capable of decrypting the print transmitting data encrypted with the public key stored in the EEPROM 45 cannot be generated.

Thereafter, the printer 30 generates a private key with the generated passphrase by the public key cryptography (step S190). If the installation position of the printer 30 is not moved, the passphrase used in this step S190 is the same as the passphrase used in step S58 in the aforementioned public key generation process. Therefore, the private key which corresponds to the public key generated in step S58 is generated. Subsequently, the printer 30 decrypts the received print transmitting data D10 with the generated private key and acquires the print data D05 (step S192).

Thereafter, the printer 30 judges whether the print transmitting data D10 can be decrypted with the private key (step S194). When the print transmitting data D1 can be decrypted (step S194: Yes), the printer 30 executes a print operation by driving the print engine 52 based on the acquired print data D05 (step S196). Specifically, the printer 30 performs a language interpretation of the print data D05 and generates print request data fitting the print engine 52. Then, by transmitting this print request data to the print engine 52, print sheets or the like are printed by the print engine 52.

At a point in time when the print operation has been properly completed, the printer 30 transmits the print completion notice that the print operation has been properly completed as the print result information to the print client 20 (step S198).

Contrary to this, when it is judged in step S194 that the print transmitting data D10 cannot be decrypted (step S194: No), the printer 30 transmits the undecryptable notice as the print result information to the print client 20 (step S200).

After step S198 or step S200, the printer 30 completes the connection with the print client 20(step S202). Then, the printer 30 returns to the aforementioned process in step S180.

Figure 11B:
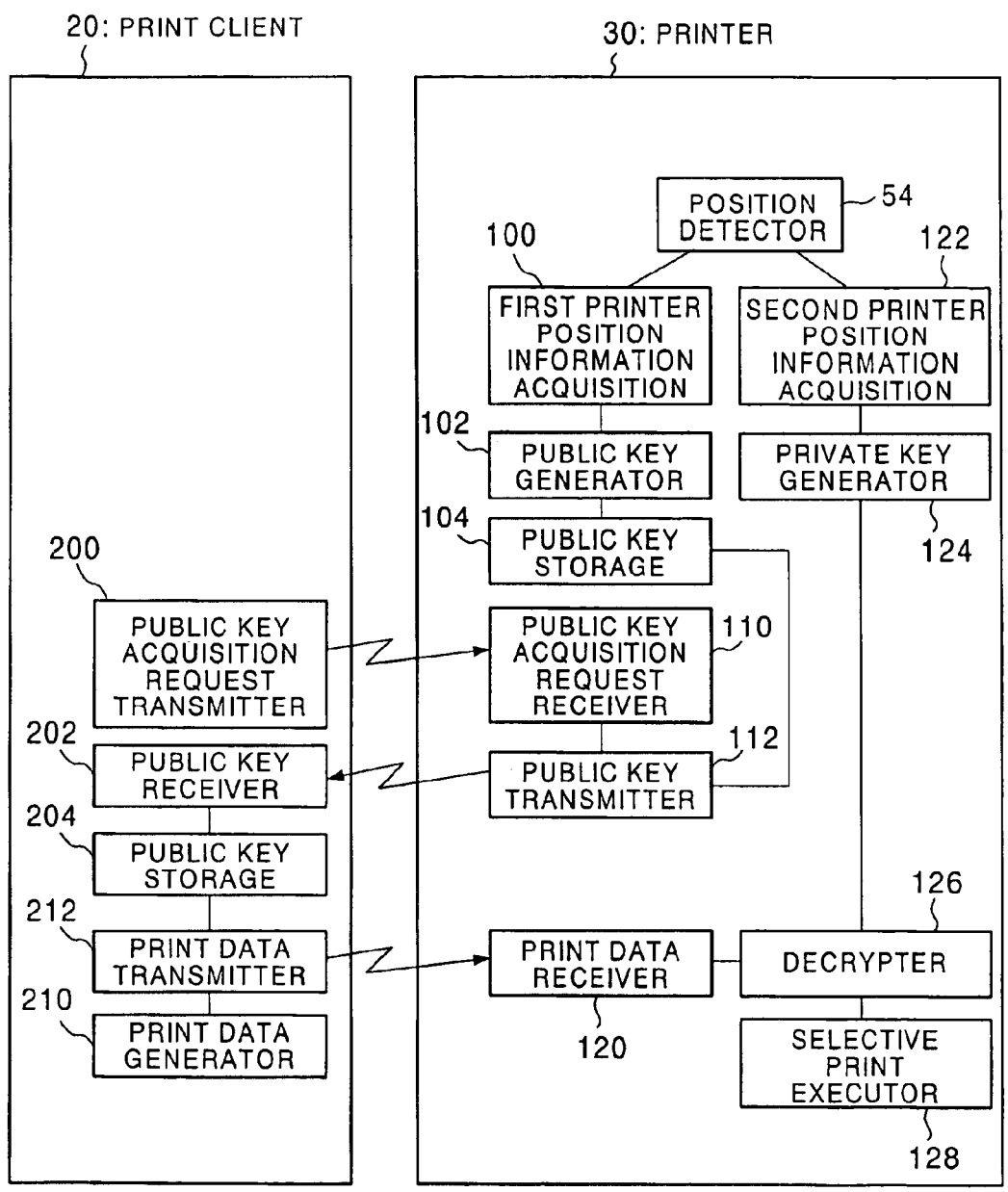
FIG. 11B is a diagram showing a hardware structure of the print client and the printer when the process according to the first embodiment of the present invention is realized by hardware.

FIG. 11B is a diagram showing a hardware structure of the print client 20 and the printer 30 when the aforementioned process is realized by hardware. As shown in FIG. 11B, the printer 30 includes the position detector 54 which acquires the printer position information to specify a place where the printer 30 is installed. Then, a first printer position information acquisition 100 acquires the printer position information from the position detector 54 and regards the printer position information as first printer position information. A public key generator 102 generates a public key with a passphrase containing at least the first printer position information. However, even if a private key is generated when the public key is generated, the private key is abandoned.

The public key generated by the public key generator 102 is stored in the public key storage 104. However, the number of times the public key is allowed to be stored in the public key storage 104 is limited to a predetermined number of times (for example, one time).

According to user's request, a public key acquisition request transmitter 200 of the print client 20 transmits a public key acquisition request to the printer 30 at optional timing in order to request a transmission of a public key. A public key acquisition request receiver 110 receives the public key acquisition request. Then, a public key transmitter 112 reads the public key stored in the public key storage 104 and transmits the public key to the print client 20. A public key receiver 202 of the print client 20 receives the public key and the public key is stored in a public key storage 204.

According to user's print request, a print data generator 210 of the print client 20 generates print data. A print data transmitter 212 reads the public key from the public key storage 204, encrypts the print data with the public key, and transmits it to the printer 30.

A print data receiver 120 of the printer 30 receives the print data. When the print data is received at the printer 30, a second printer position information acquisition 122 acquires printer position information from the position detector 54 and regards the printer position information as second printer position information. Then, a private key generator 124 generates a private key with a passphrase containing at least the second printer position information. A decrypter 126 decrypts the print data received by the print data receiver 120 with the private key. A selective print executor 128 executes a print operation based on the print data when the print data is decrypted with the private key, but the selective print executor 128 does not executes a print operation based on the print data when the print data is not decrypted with the private key.

As stated above, according to the print system of this embodiment, the printer 30 can generate a public key and register this public key with the EEPROM 45 only one time, so that the installation place where the printer 30 can execute a proper print operation can be limited to a place where the public key is generated.

Namely, based on a request from the user, the printer 30 generates a public key with a passphrase containing printer position information at this point in time, and stores the public key in the EEPROM 45. When the printer 30 transmits a public key to the print client 20, the printer 30 reads the public key stored in the EEPROM 45 and transmits this public key.

When the print client 20 transmits the print data D05 to the printer 30, the print client 20 transmits the print transmitting data D10 generated by encrypting the print data D05 with this public key. Each time the printer 30 receives the print transmitting data D10, the printer 30 acquires printer position information at that point in time, and generates a private key with a passphrase containing this printer position information. Then, the printer 30 decrypts the print transmitting data D10 with this private key, and when the print transmitting data D10 can be decrypted, the printer 30 executes a print operation, and when the print transmitting data D10 cannot be decrypted, the printer 30 does not execute the print operation. Accordingly, if the printer position information when the public key is stored in the EEPROM 45 and the printer position information when the private key is generated are different, the received print transmitting data D10 cannot be properly decrypted, so that a proper print result cannot be obtained. Thus, the position where the printer 30 is used can be limited.

[Second Embodiment]

In the second embodiment, a modification is made to the aforementioned first embodiment, and the printer 30 stores printer position information in place of a public key in the EEPROM 45. Further details will be given below.

It should be mentioned that the configuration of a print system according to this embodiment is the same as that in FIG. 1 in the aforementioned first embodiment, the configuration of the printer 30 is the same as that in FIG. 2 described above, and that the configuration of the print client 20 is the same as that in FIG. 3 described above. Moreover, a public key request process, a print request process, and a print execution process according to this embodiment are the same as those in the aforementioned first embodiment.

However, in the printer 30 according to this embodiment, a printer position information registration process in place of the public key generation process is executed.

Figure 12:
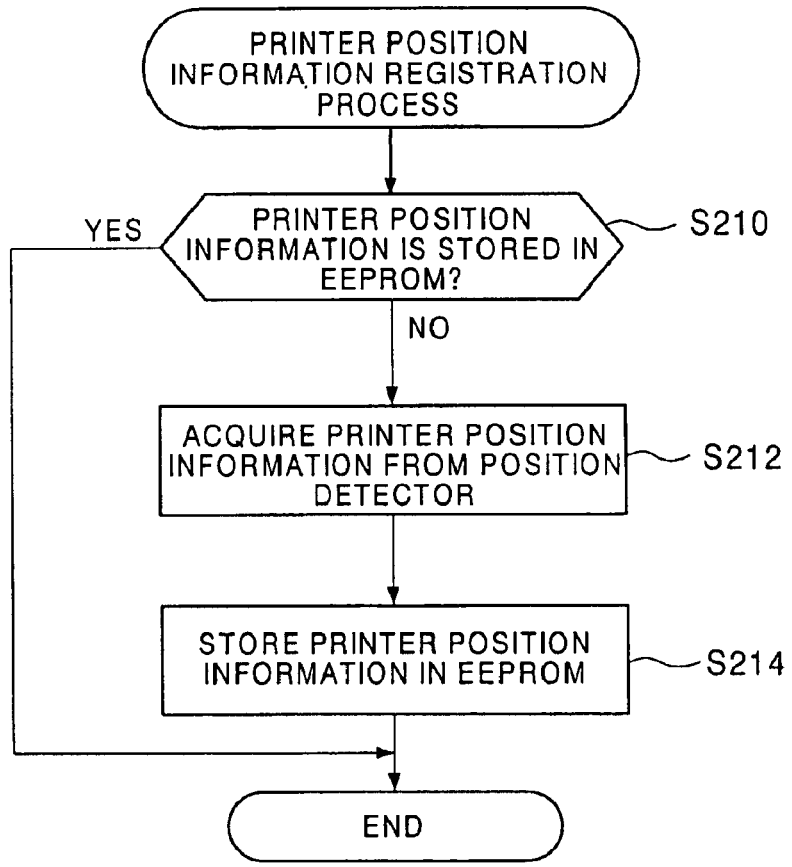
FIG. 12 is a flowchart explaining a printer position information registration process executed by a printer according to a second embodiment of the present invention.

FIG. 12 is a flowchart explaining the printer position information registration process executed by the printer 30 according to this embodiment. This printer position information registration process is realized by making the CPU 40 read and execute a printer position information registration program stored in the ROM 44 or the hard disk 58 in the printer 30. Moreover, in this embodiment, this printer position information registration process is activated and executed when the user operates the control panel of the printer 30 to thereby instruct the execution of the printer position information registration process.

As shown in FIG. 12, in the printer position information registration process according to this embodiment, the printer 30 judges whether printer position information is already stored in the EEPROM 45(step S210). When the printer position information is already stored in the EEPROM 45 (step S210: Yes), this printer position information registration process is completed.

On the other hand, when any printer position information is not stored in the EEPROM 45 (step S210: No), the printer 30 acquires printer position information on the printer 30 at this point in time from the position detector 54 (step S212). Thus, information on the installation position of the printer 30 at this point in time can be acquired.

Figure 13:
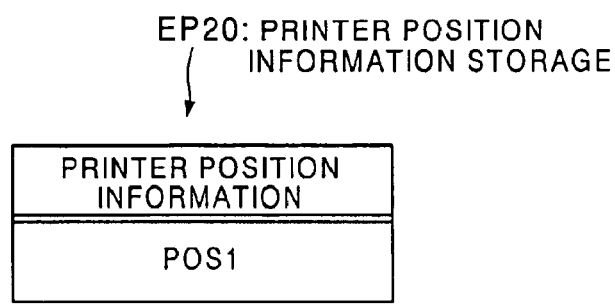
FIG. 13 is a diagram showing the structure of a printer position information storage formed in an EEPROM of the printer according to the second embodiment of the present invention.

Then, the printer 30 stores the acquired printer position information in the EEPROM 45 (step S214). FIG. 13 is a diagram showing the structure of a printer position information storage EP20 formed in a partial region of the EEPROM 45. As shown in FIG. 13, the printer 30 stores and holds the acquired printer position information in the printer position information storage EP20.

Thus, the printer position information registration process according to this embodiment is completed.

Figure 14:
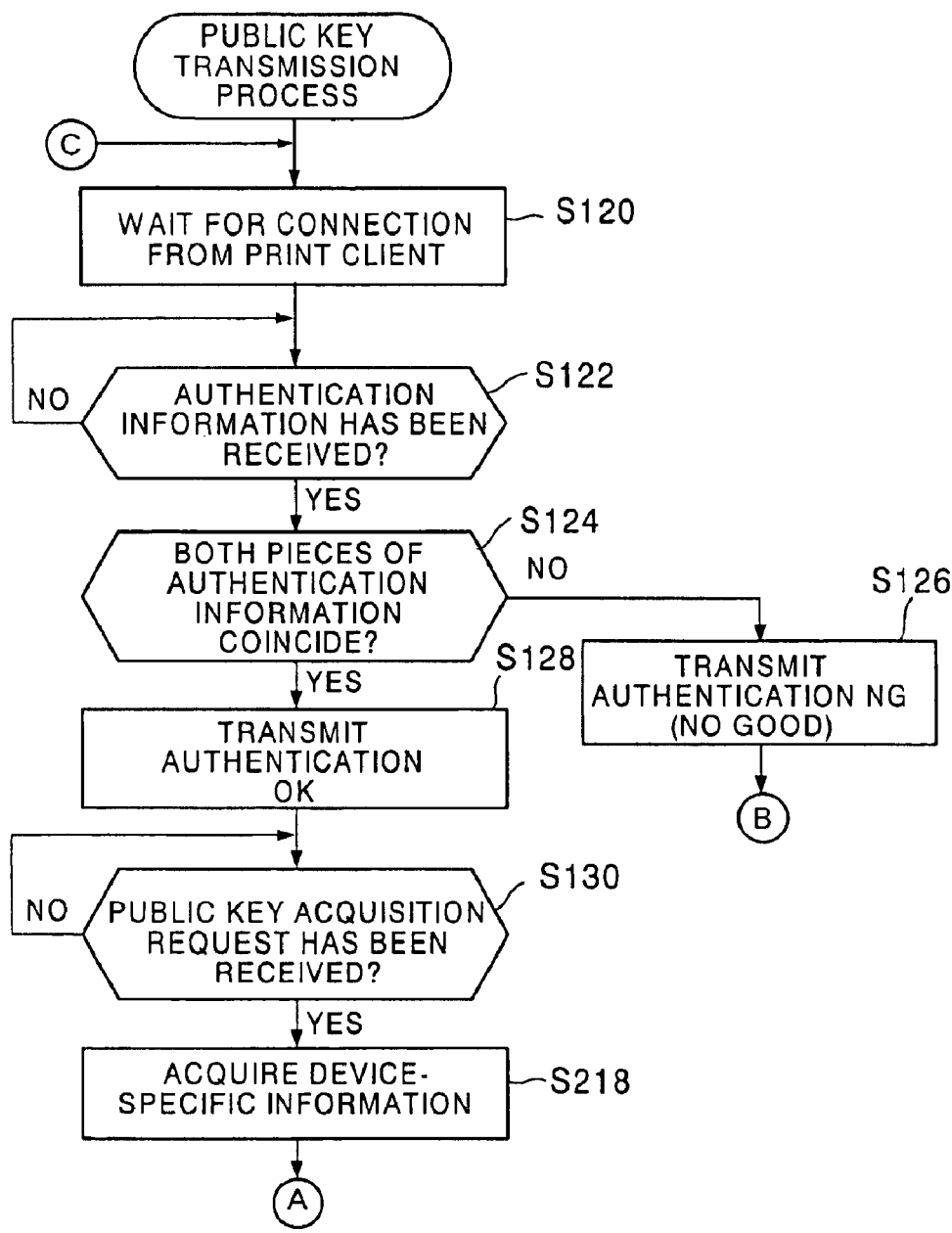
FIG. 14 is a part of a flowchart explaining a public key transmission process executed by the printer according to the second embodiment of the present invention (First part)
Figure 15A:
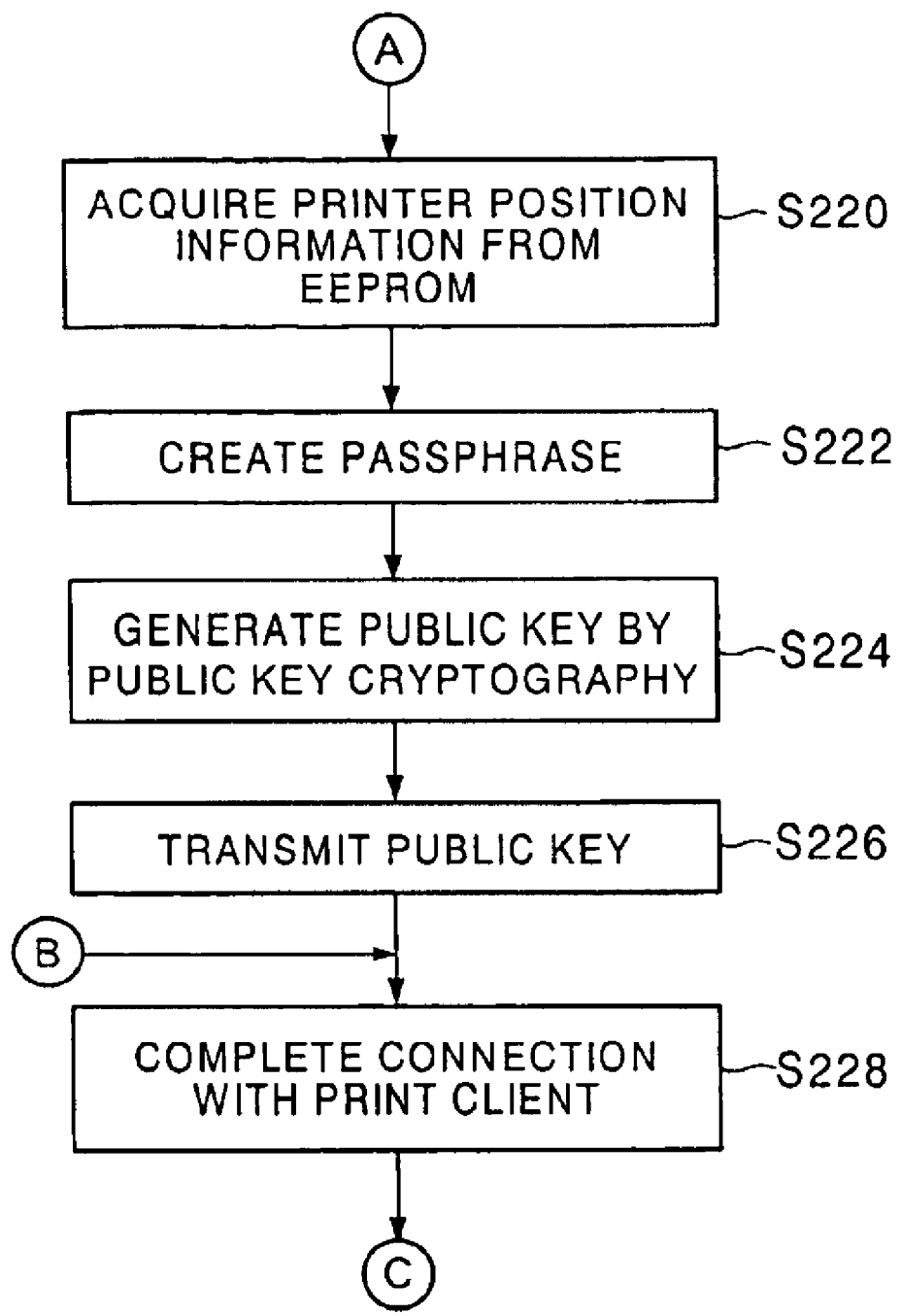
FIG. 15A is a part of the flowchart explaining the public key transmission process executed by the printer according to the second embodiment of the present invention (Second part)

FIG. 14 and FIG. 15A are flowcharts explaining a public key transmission process according to this embodiment. As shown in FIG. 14, the public key transmission process according to this embodiment is the same as that in the aforementioned first embodiment up to step S130.

After step S130, in the public key transmission process according to this embodiment, the printer 30 acquires device-specific information (step S218). Here, similarly to the aforementioned first embodiment, the device-specific information is identification information specifically assigned to the printer 30, and it is, for example, a manufacturer's serial number, an MAC address, or the like of the printer 30.

Then, as shown in FIG. 15A, the printer 30 reads the printer position information stored in the printer position information storage EP20 from the EEPROM 45 (step S220). Namely, in this embodiment, each time the transmission of a public key is requested by the print client 20, a public key is generated by the public key cryptography, but the printer information used for a passphrase for the public key is fixed. Therefore, each time a public key is generated, the same public key is obtained.

Subsequently, the printer 30 creates a passphrase with the device-specific information and the printer position information (step S222). There are various methods of creating the passphrase. In this embodiment, the passphrase is created by simply joining the printer position information after the device-specific information. Incidentally, the passphrase may contain data other than these device-specific information and printer position information.

Thereafter, the printer 30 generates a public key with the passphrase created in step S222 by the public key cryptography (step S224). Then, the printer 30 transmits the generated public key to the print client 20 (step S226). Subsequently, the printer 30 completes the connection with the print client 20 (step S228), and returns to step S120 in FIG. 14.

Figure 15B:
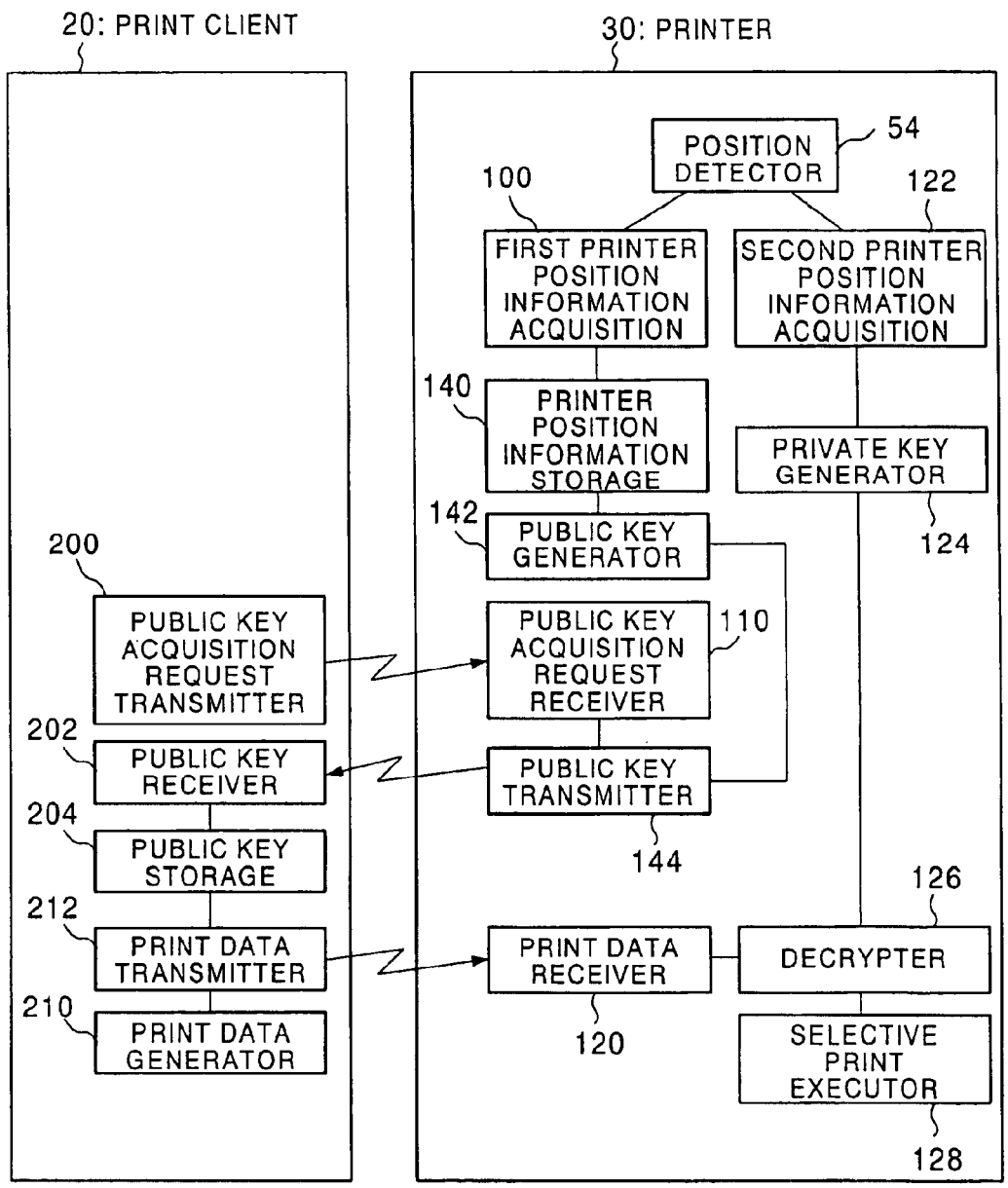
FIG. 15B is a diagram showing a hardware structure of the print client and the printer when the process according to the second embodiment of the present invention is realized by hardware.

FIG. 15B is a diagram showing a hardware structure of the print client 20 and the printer 30 when the aforementioned process is realized by hardware. A different point from the aforementioned FIG. 11B will be explained. The printer 30 includes a printer position information storage 140 in which first printer position information acquired by the first printer position information acquisition 100 is stored. However, the number of times the first printer position information is allowed to be stored in the printer position information storage 140 is limited to a predetermined number of times (for example, one time).

If the public key acquisition request receiver 110 receives the public key acquisition request, then a public key generator 142 reads the first printer position information from the printer position information storage 140, and generates a public key with a passphrase containing at least the first printer position information. Then, public key transmitter 144 transmits the public key generated by the public key generator 142 to the print client 20. However, even if a private key is generated when public key generator 142 generates the public key, the private key is abandoned.

As stated above, according to the print system of this embodiment, the printer 30 can register only one piece of printer position information which is contained in a passphrase when the printer 30 generates a public key, so that the installation place where the printer 30 can execute a proper print operation can be limited to a place where the printer position information is registered with the EEPROM 45. Namely, based on a request from the user, the printer 30 registers printer position information at some point in time with the EEPROM 45. Each time the transmission of a public key is requested by the print client 20, the printer 30 reads the printer position information from the EEPROM 45, generates a public key with a passphase containing the printer position information, and transmits the public key to the print client 20.

When the print client 20 transmits the print data D05 to the printer 30, the print client 20 transmits the print transmitting data D10 generated by encrypting the print data D05 with this public key. Each time the printer 30 receives the print transmitting data D10, the printer 30 acquires printer position information at that point in time, and generates a private key with a passphrase containing this printer position information. Then, the printer 30 decrypts the print transmitting data D10 with this private key, and when the print transmitting data D10 can be decrypted, the printer 30 executes a print operation, and when the print transmitting data D10 cannot be decrypted, the printer 30 does not execute the print operation. Accordingly, if the printer position information registered with the EEPROM 45 and the printer position information when the private key is generated are different, the received print transmitting data D10 cannot be properly decrypted, so that a proper print result cannot be obtained. Thus, the position where the printer 30 is used can be limited.

[Third Embodiment]

In the third embodiment, a modification is made to the aforementioned second embodiment, and the generation of a public key is stopped when the printer 30 is moved. Further details will be given below.

It should be mentioned that the configuration of a print system according to this embodiment is the same as that in FIG. 1 in the aforementioned first embodiment, the configuration of the printer 30 is the same as that in FIG. 2 described above, and that the configuration of the print client 20 is the same as that in FIG. 3 described above. Moreover, a print request process, a print execution process, and a printer position information registration process according to this embodiment are the same as those in the aforementioned second embodiment.

Figure 16:
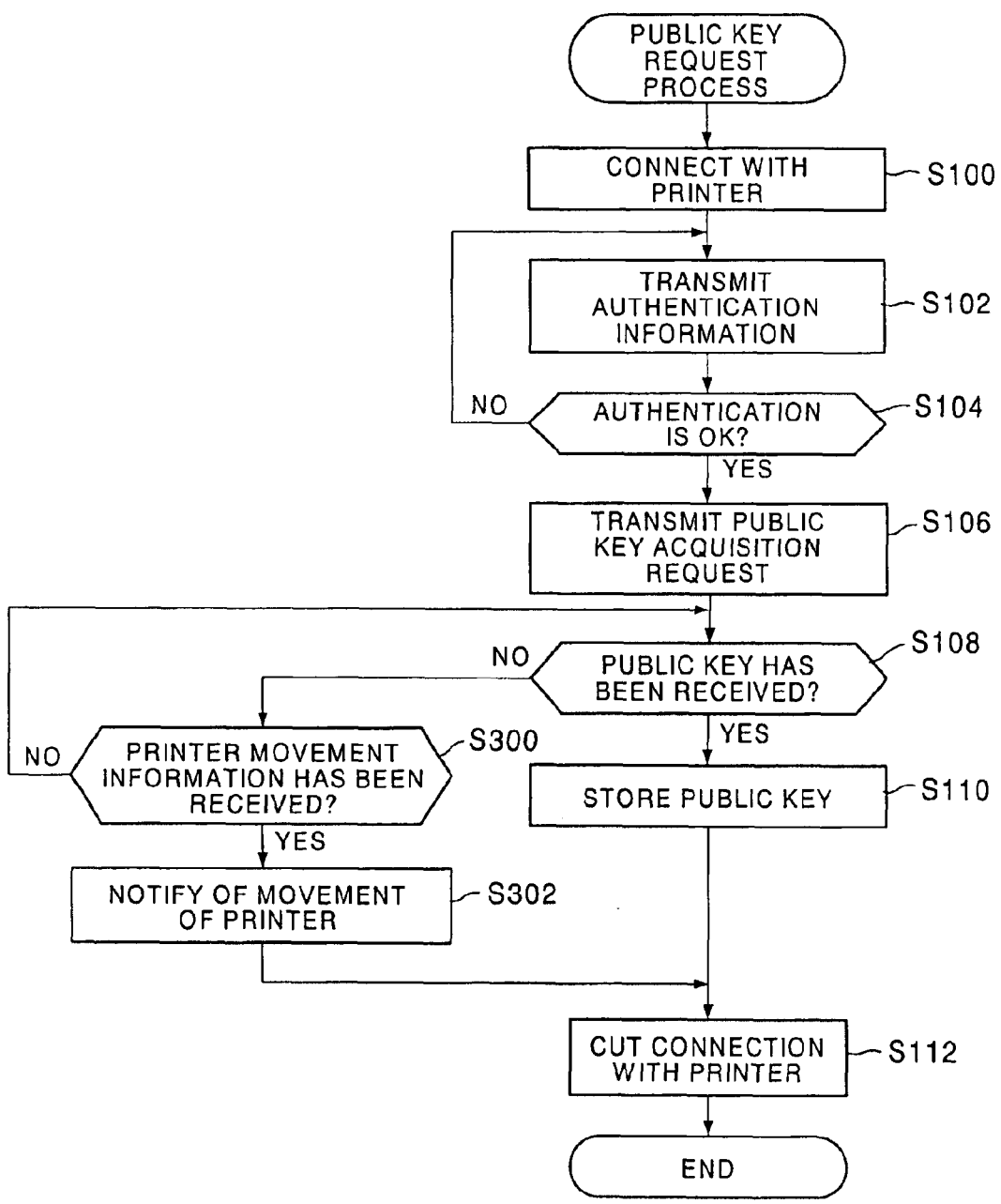
FIG. 16 is a flowchart explaining a public key request process executed by a print client according to a third embodiment of the present invention.

However, a public key request process according to this embodiment is slightly different from that in the aforementioned second embodiment. FIG. 16 is a flowchart explaining the contents of the public key request process according to this embodiment.

As shown in FIG. 16, the process from step S100 to step S112 is the same as that in the aforementioned second embodiment, but when it is judged in step S108 that the public key has not been received (step S108: No), it is judged whether printer movement information has been received from the printer 30 (step S300). When the printer movement information has not been received (step S300: No), the process from step S108 is repeated.

On the other hand, when the printer movement information has been received (step S300: Yes), the user is notified that the public key cannot be generated because the printer 30 has been moved (step S302). Then, the connection with the printer 30 is cut (step S112), and the public key request process is completed.

Figure 17:
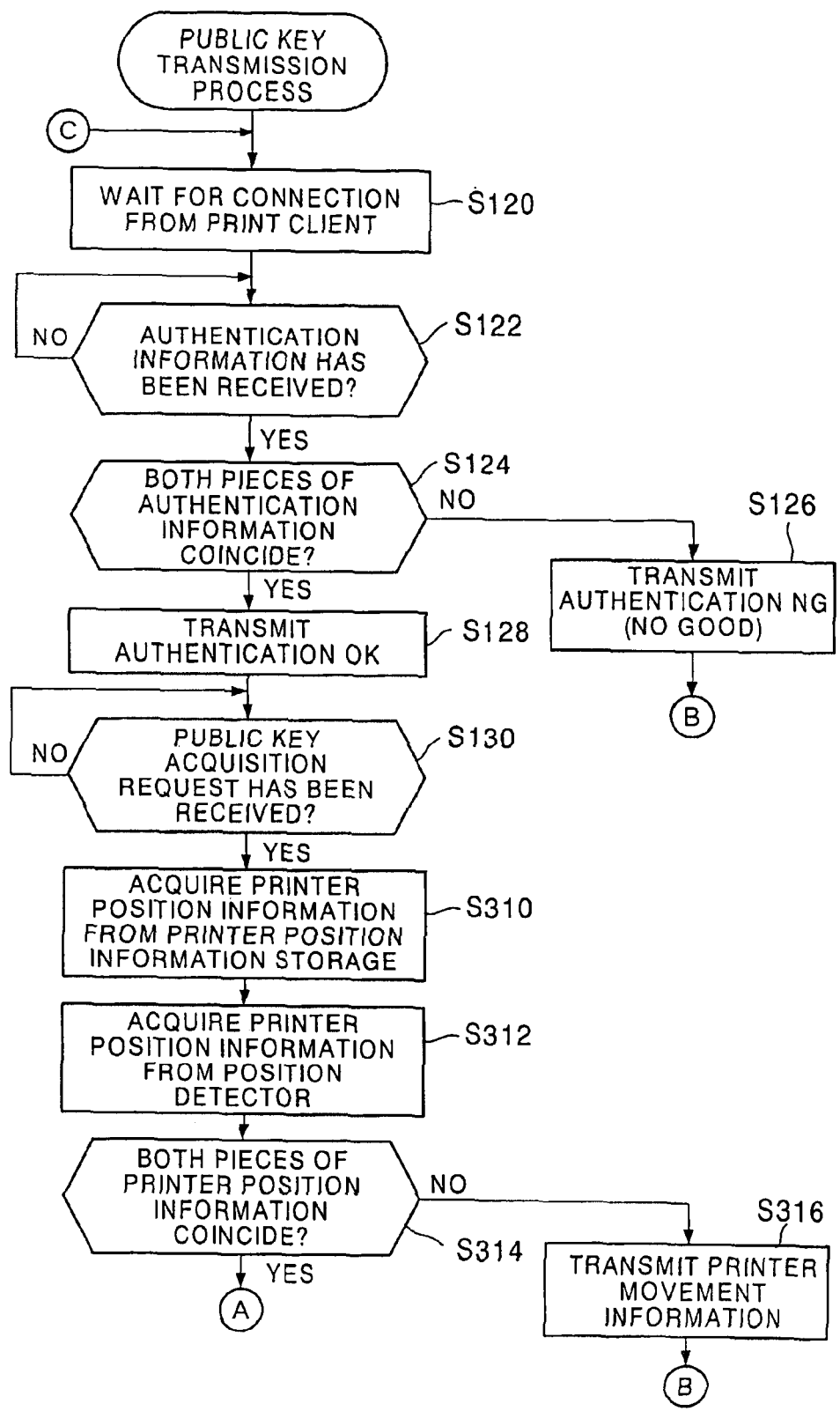
FIG. 17 is a part of a flowchart explaining a public key transmission process executed by a printer according to the third embodiment of the present invention (First part)
Figure 18A:
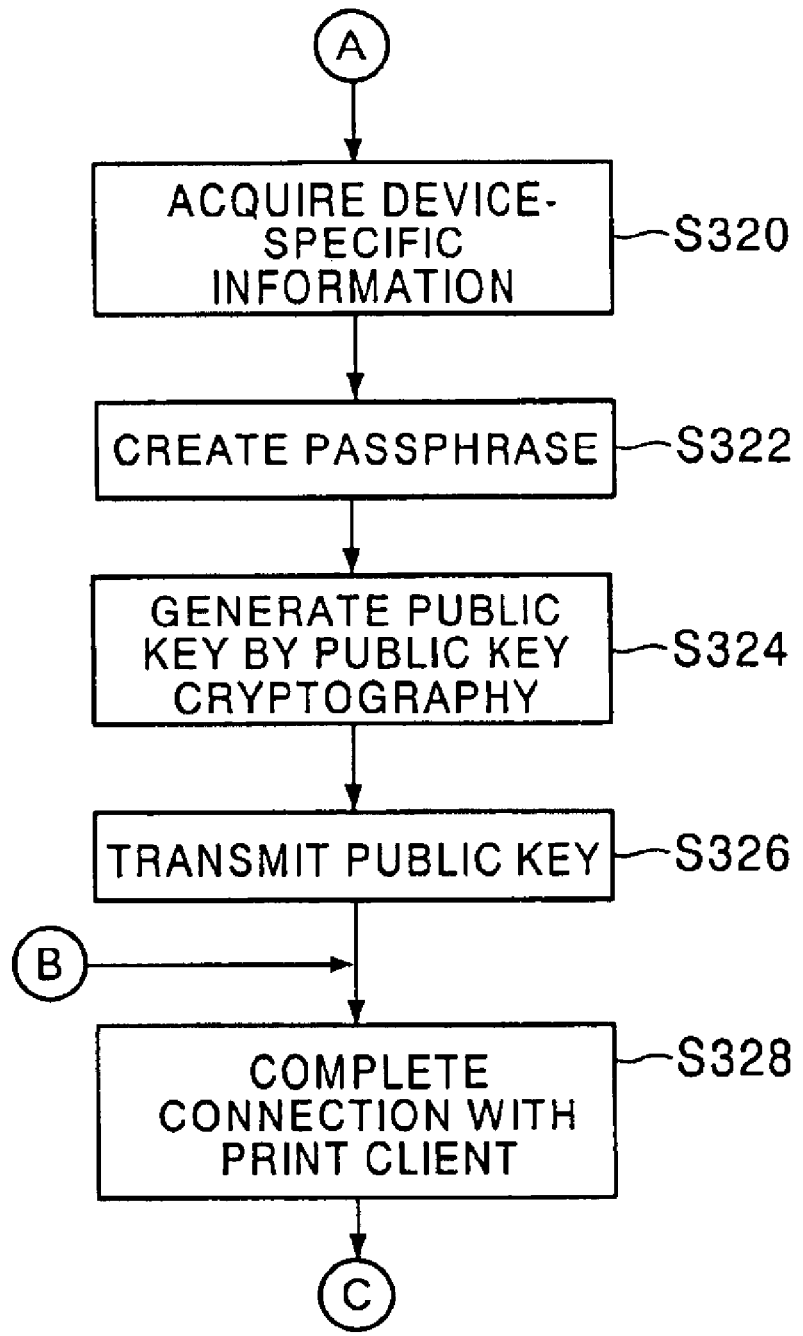
FIG. 18A is a part of the flowchart explaining the public key transmission process executed by the printer according to the third embodiment of the present invention (Second part)

FIG. 17 and FIG. 18A are flowcharts explaining the contents of a public key transmission process according to this embodiment. As shown in FIG. 17, the public key transmission process according to this embodiment is the same as that in the aforementioned first embodiment up to step S130.

After step S130, in the public key transmission process according to this embodiment, the printer 30 acquires printer position information stored in the printer position information storage EP20 (step S310). Subsequently, the printer 30 acquires printer position information on the printer 30 at this point in time from the position detector 54 (step S312).

Then, the printer 30 judges whether the printer position information acquired from the printer position information storage EP20 and the printer position information acquired from the position detector 54 coincide with each other (step S314). When these two piece of printer position information do not coincide (step S314: No), this indicates that the printer 30 is moved, compared with when the printer position information was registered in the printer position information registration process, whereby the printer 30 transmits the printer movement information to the print client 20 without generating a public key (step S316). Thereafter, as shown in FIG. 18A, the connection with the print client 20 is cut (step S328), and the public key transmission process is completed.

On the other hand, as shown in FIG. 17, when the printer position information acquired from the printer position information storage EP20 and the printer position information acquired from the position detector 54 coincide (step S314: Yes), the printer 30 acquires device-specific information as shown in FIG. 18A (step S320).

Then, the printer 30 creates a passphrase with the device-specific information and the printer position information acquired in step S310 or step S312 (step S322). There are various methods of creating the passphrase. In this embodiment, the passphrase is created by simply joining the printer position information after the device-specific information. Incidentally, the passphrase may contain data other than these device-specific information and printer position information.

Thereafter, the printer 30 generates a public key with the passphrase created in step S322 by the public key cryptography (step S324). Then, the printer 30 transmits the generated public key to the print client 20 (step S326). Subsequently, the printer 30 completes the connection with the print client 20 (step S328), and returns to step S120 in FIG. 17.

Figure 18B:
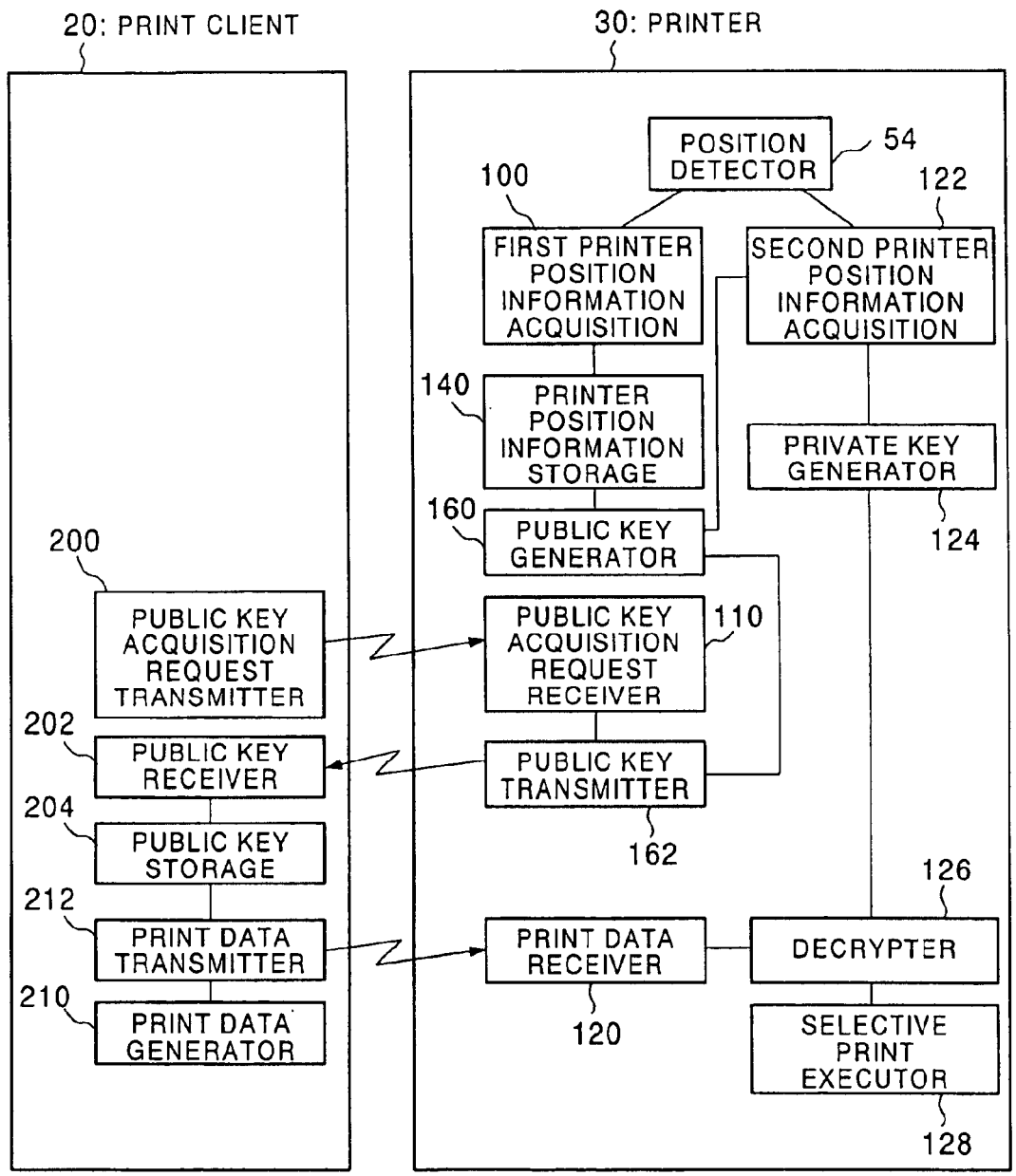
FIG. 18B is a diagram showing a hardware structure of the print client and the printer when the process according to the third embodiment of the present invention is realized by hardware.

FIG. 18B is a diagram showing a hardware structure of the print client 20 and the printer 30 when the aforementioned process is realized by hardware. A different point from the aforementioned FIG. 15B will be explained. When the public key acquisition request receiver 110 of the printer 30 receives the public key acquisition request, the second printer position information acquisition 122 acquires second printer position information from the position detector 54. Then, a public key generator 160 compares the first printer position information stored in the printer position information storage 140 and the second printer position information acquired by the second printer position information acquisition 122. If the first printer position information and the second printer position information coincide, then the public key generator 160 generates a public key with a passphrase containing at least the first printer position information or the second printer position information. A public key transmitter 162 transmits the public key generated by the public key generator 160 to the print client 20.

As stated above, according to the print system of this embodiment, the generation of a public key is stopped when the position where printer position information is registered with the printer 30 and the position of the printer 30 when the generation of the public key is tried are different, whereby the position where the printer 30 generates a public key and transmits the public key to the print client 20 can be limited. Hence, the position where the printer 30 can be properly used can be limited.

[Fourth Embodiment]

In a print system according to the fourth embodiment, a public key is generated with a passphrase containing at least printer position information which indicates a position where a printer is installed at this point in time, and stored in the printer. The generation of the public key is executed by the printer only when being requested by a particular person whose inputted public key generation authentication information coincides with registered public key generation authentication information.

When transmission of a public key is requested by the print client, the printer reads a stored public key and transmits this public key to the print client. When the print client transmits print data to this printer, the print client transmits print transmitting data generated by encrypting the print data with the acquired public key. The printer which has received this print transmitting data generates, at the time of reception, a private key with a passphrase containing at least printer position information at this point in time, and executes a print operation only when the print transmitting data can be decrypted with this private key. By doing so, a proper print operation can be executed only in a position where a person with proper authority registered the public key with the printer. Further details will be given below.

It should be mentioned that the configuration of the print system according to this embodiment is the same as that in FIG. 1 described above, the internal configuration of the printer 30 is the same as that in FIG. 2 described above, and that the internal configuration of the print client 20 is the same as that in FIG. 3 described above.

First, a brief explanation of a process when the print client 20 performs printing with the printer 30 in the print system according to this embodiment will be given.

In this embodiment, the printer 30 generates a public key based on a request from a person with proper authority and stores the public key in the EEPROM 45. In this embodiment, whether an operator is a person with proper authority or not is judged by making the operator input public key generation authentication information from the control panel of the printer 30. Moreover, in this embodiment, this public key generation authentication information is composed of a combination of an ID and a password. The public key generation authentication information may be inputted from the print client 20 and transmitted to the printer 30 via the printer cable 10. Further, when the printer 30 is a network printer, the public key generation authentication information may be transmitted to the printer 30 from a different place via the network. The process thereafter is the same as that in the aforementioned first embodiment.

Figure 19A:
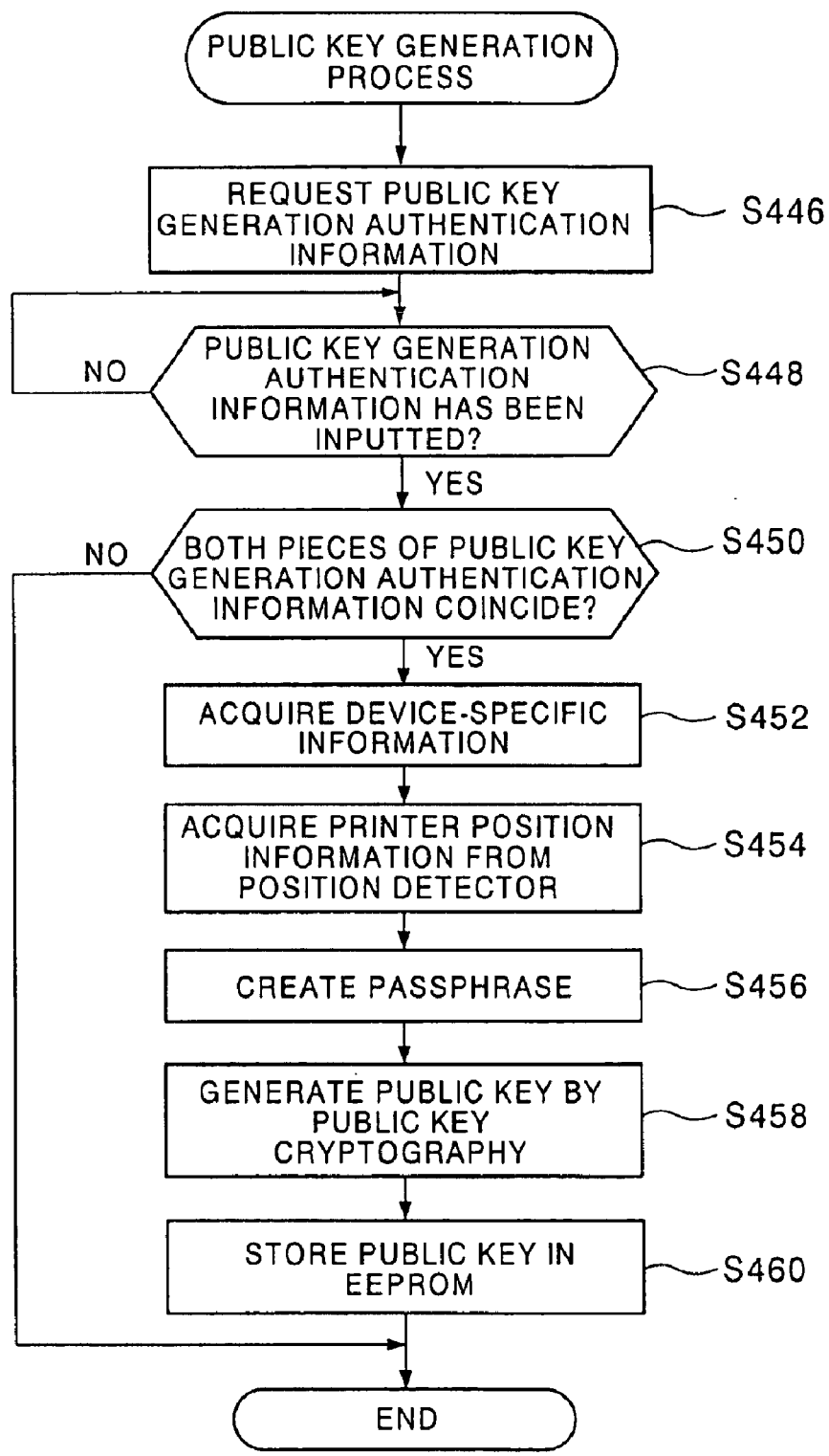
FIG. 19A is a flowchart explaining a public key generation process executed by a printer according to a fourth embodiment of the present invention.

Next, the contents of a process in the print system according to this embodiment will be explained in detail using a flowchart. FIG. 19A is a flowchart explaining a public key generation process executed by the printer 30. This public key generation process is realized by making the CPU 40 read and execute a public key generation program stored in the ROM 44 or the hard disk 58 in the printer 30. Moreover, in this embodiment, this public key generation process is activated and executed when an operator (for example, a person in charge of maintenance in a manufacturer of the printer 30) operates the control panel of the printer 30 to thereby instruct the execution of the public key generation process.

As shown in FIG. 19A, when the public key generation process is executed, the printer 30 first requests the operator to input public key generation authentication information (step S446). In this embodiment, the operator inputs an ID and a password as the public key generation authentication information from the control panel of the printer 30.

Then, the printer 30 judges whether the public key generation authentication information has been inputted (step S448). When the public key generation authentication information has not been inputted (step S448: No), the printer 30 stands by while repeating the process in step S448.

On the other hand, when the public key generation authentication information has been inputted (step S448: Yes), the printer 30 judges whether the inputted public key generation authentication information coincides with registered public key generation authentication information (step S450). In this embodiment, the registered public key generation authentication information is previously stored in the ROM 44, the EEPROM 45, or the hard disk 58. Therefore, the printer 30 reads the stored public key generation authentication information, and judges whether the read public key generation authentication information coincides with the public key generation authentication information inputted by the operator. Specifically, whether registered ID and password coincide with the ID and password inputted by the operator is judged.

When these two pieces of public key generation authentication information do not coincide (step S450: No), this public key generation process is completed without a new public key being generated.

On the other hand, when these two pieces of public key generation authentication information coincide (step S450: Yes), the printer 30 acquires device-specific information on this printer 30 (step S452). Here, the device-specific information is identification information specifically assigned to the printer 30, and it is, for example, a manufacturer's serial number, an MAC address, or the like of the printer 30.

Then, the printer 30 acquires printer position information on the printer 30 at this point in time from the position detector 54 (step S454). Thereby, the printer 30 can acquire information on the installation position of the printer 30 at this point in time.

Subsequently, the printer 30 creates a passphrase with the device-specific information and the printer position information (step S456). There are various methods of creating the passphrase. In this embodiment, the passphrase is created by simply joining the printer position information after the device-specific information. Incidentally, the passphrase may contain data other than these device-specific information and printer position information.

Thereafter, the printer 30 generates a public key with the passphrase created in step S456 by the public key cryptography (step S458). Then, the printer 30 stores the generated public key in the EEPROM 45 shown in FIG. 6 (step S560). Note that when a private key is also generated when the public key is generated, the private key is abandoned without being stored.

Thus, the public key generation process according to this embodiment is completed.

It should be mentioned that in this embodiment, a public key request process is the same as that in FIG. 7 described above, a public key transmission process is the same as that in FIG. 9 described above, a print request process is the same as that in FIG. 10 described above, and that a print execution process is the same as that in FIG. 11A described above.

Figure 19B:
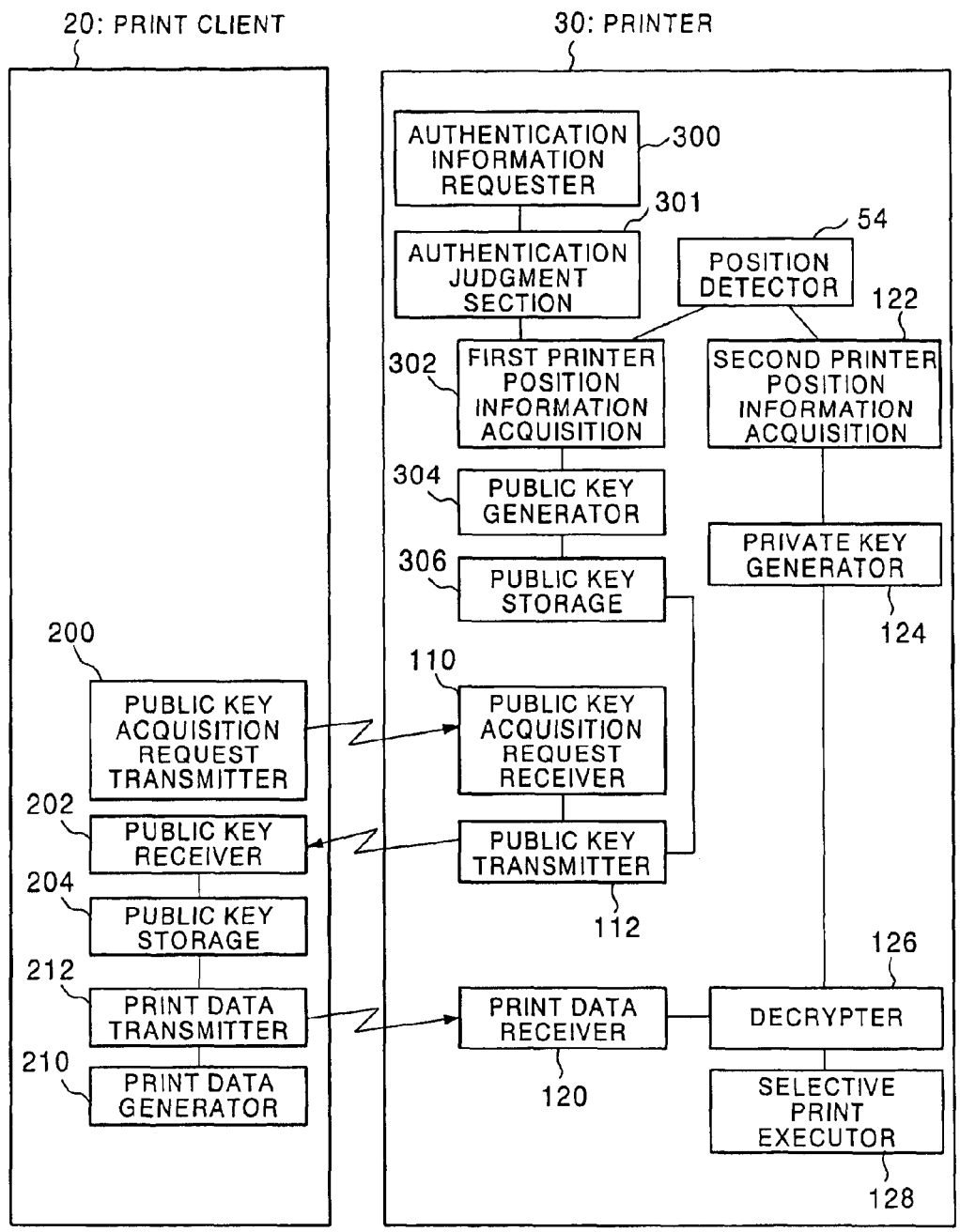
FIG. 19B is a diagram showing a hardware structure of the print client and the printer when the process according to the fourth embodiment of the present invention is realized by hardware.

FIG. 19B is a diagram showing a hardware structure of the print client 20 and the printer 30 when the aforementioned process is realized by hardware. A different point from the aforementioned FIG. 11B will be explained. If a generation of a public key is requested, a authentication information requester 300 of the printer 30 requests an operator to input authentication information. A authentication judgment section 301 judges whether the inputted authentication information coincides with registered authentication information. If the inputted authentication information and the registered authentication information coincide, the authentication judgment section 301 judges that the operator has proper authority.

If the operator has the proper authority, a first printer position information acquisition 302 acquires printer position information from the position detector 54, and regards the printer position information as first printer position information. Then, a public key generator 304 generates a public key with a passphrase containing at least the first printer position information, and the generated public key is stored in a public key storage 306.

As stated above, according to the print system of this embodiment, the printer 30 can generate a public key and register the public key with the EEPROM 45 only when a person with proper authority provides instructions, whereby the installation place where the printer 30 can execute a proper print operation can be limited.

More specifically, when an operator with proper authority requests the printer 30 to generate a public key, the printer 30 generates a public key with a passphrase containing printer position information at this point in time and stores the public key in the EEPROM 45. On the other hand, in the case of an operator without proper authority, the printer 30 does not generate a public key. When transmitting a public key to the print client 20, the printer 30 reads the public key stored in the EEPROM 45 and transmits this public key.

When the print client 20 transmits the print data D05 to the printer 30, the print client 20 transmits the print transmitting data D10 generated by encrypting the print data D05 with this public key. Each time the printer 30 receives the print transmitting data D10, the printer 30 acquires printer position information at that point in time, and generates a private key with a passphrase containing this printer position information. Then, the printer 30 decrypts the print transmitting data D10 with this private key, and when the print transmitting data D10 can be decrypted, the printer 30 executes a print operation, and when the print transmitting data D10 cannot be decrypted, the printer 30 does not execute the print operation. Accordingly, if the printer position information when the public key is stored in the EEPROM 45 and the printer position information when the private key is generated are different, the received print transmitting data D10 cannot be properly decrypted, so that a proper print result cannot be obtained. Thus, the position where the printer 30 can be used can be limited to a place where the person with proper authority instructs the printer 30 to generate the public key.

Moreover, as long as the operator has proper authority, the operator can change the public key stored in the EEPROM 45, and hence, even when the installation place of the printer is changed for good reason by the printer manufacturer or the like, the operator can continue to use the printer 30. Namely, if the operator with proper authority instructs the printer 30 to generate a public key again in a new installation place of the printer 30, the new public key is generated based on printer position information on this place and stored in the EEPROM 45. Accordingly, the printer 30 can be used effectively.

[Fifth Embodiment]

In the fifth embodiment, a modification is made to the aforementioned fourth embodiment, and the printer 30 stores printer position information in place of a public key in the EEPROM 45. Further details will be given below.

It should be mentioned that the configuration of a print system according to this embodiment is the same as that in FIG. 1 in the aforementioned first embodiment, the configuration of the printer 30 is the same as that in FIG. 2 described above, and that the configuration of the print client 20 is the same as that in FIG. 3 described above. Moreover, a public key request process, a print request process, and a print execution process according to this embodiment are the same as those in the aforementioned first embodiment.

However, in the printer 30 according to this embodiment, a printer position information registration process in place of the public key generation process in the fourth embodiment is executed.

Figure 20A:
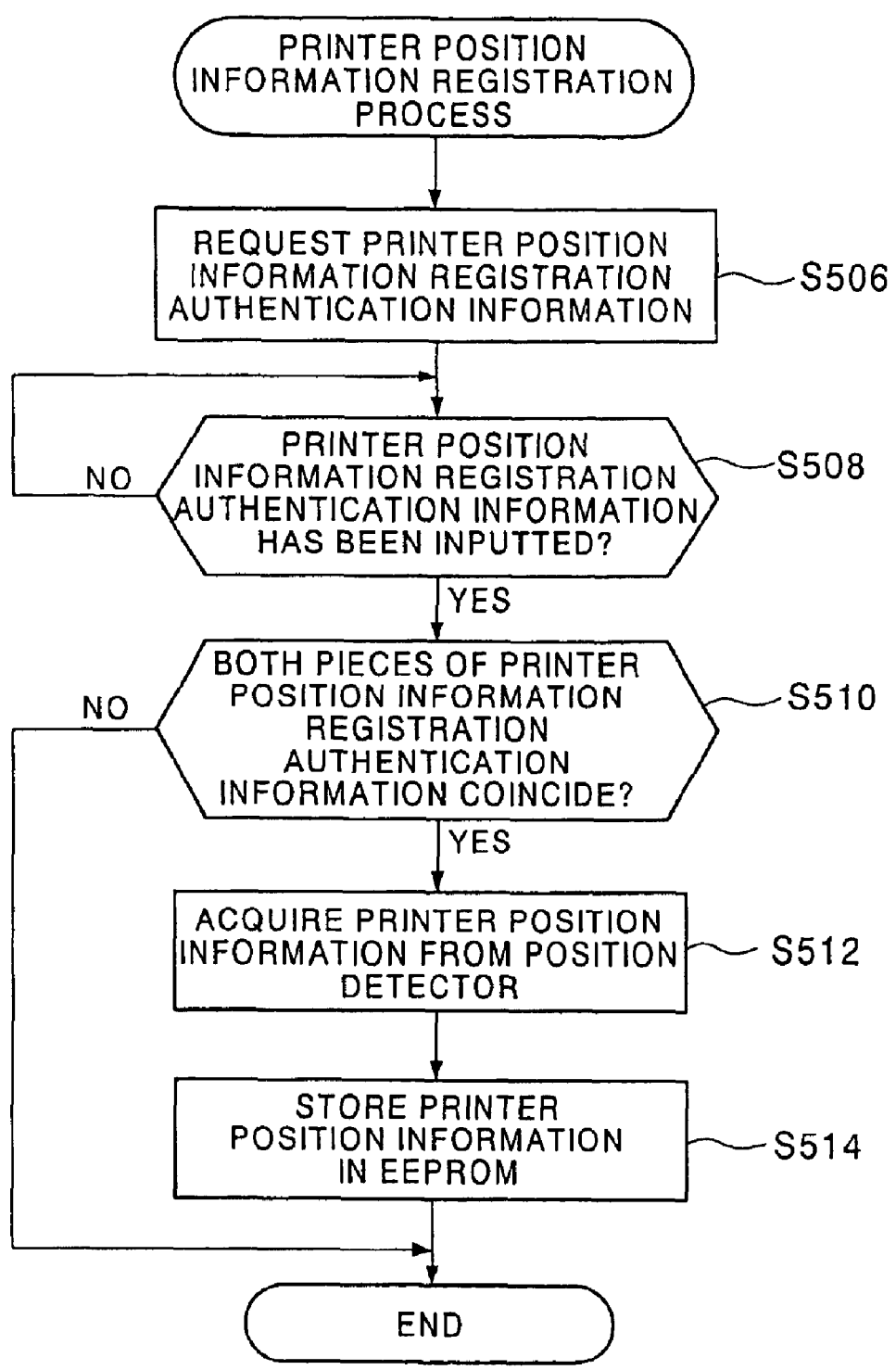
FIG. 20A is a flowchart explaining a printer position information registration process executed by a printer according to a fifth embodiment of the present invention.

FIG. 20A is a flowchart explaining the printer position information registration process executed by the printer 30 according to this embodiment. This printer position information registration process is realized by making the CPU 40 read and execute a printer position information registration program stored in the ROM 44 or the hard disk 58 in the printer 30. Moreover, in this embodiment, this printer position information registration process is activated and executed when an operator (for example, a person in charge of maintenance in a manufacturer of the printer 30) operates the control panel of the printer 30 to thereby instruct the execution of the printer position information registration process.

As shown in FIG. 20A, when the public key generation process is executed, the printer 30 first requests the operator to input printer position information registration authentication information (step S506). In this embodiment, the operator inputs an ID and a password as the printer position information registration authentication information from the control panel of the printer 30.

Then, the printer 30 judges whether the printer position information registration authentication information has been inputted (step S508). When the printer position information registration authentication information has not been inputted (step S508: No), the printer 30 stands by while repeating the process in step S508.

On the other hand, when the printer position information registration authentication information has been inputted (step S508: Yes), the printer 30 judges whether the inputted printer position information registration authentication information coincides with registered printer position information registration authentication information (step S510). In this embodiment, the registered printer position information registration authentication information is previously stored in the ROM 44, the EEPROM 45, or the hard disk 58. Therefore, the printer 30 reads the stored printer position information registration authentication information, and judges whether the read printer position information registration authentication information coincides with the printer position information registration authentication information inputted by the operator. Specifically, whether registered ID and password coincide with the ID and password inputted by the operator is judged.

When these two pieces of printer position information registration authentication information do not coincide (step S510: No), this printer position information registration process is completed without new printer position information being registered.

On the other hand, when these two pieces of printer position information registration authentication information coincide (step S510: Yes), the printer 30 acquires printer position information on this printer 30 at this point in time from the position detector 54 (step S512). Thereby, the printer 30 can acquire information on the installation position of the printer 30 at this point in time.

Subsequently, the printer 30 stores the acquired printer position information in the EEPROM 45 shown in FIG. 13 (step S514). Thus, the printer position information registration process according to this embodiment is completed.

It should be mentioned that a public key transmission process according to this embodiment is the same as that in FIG. 14 and FIG. 15A described above.

Figure 20B:
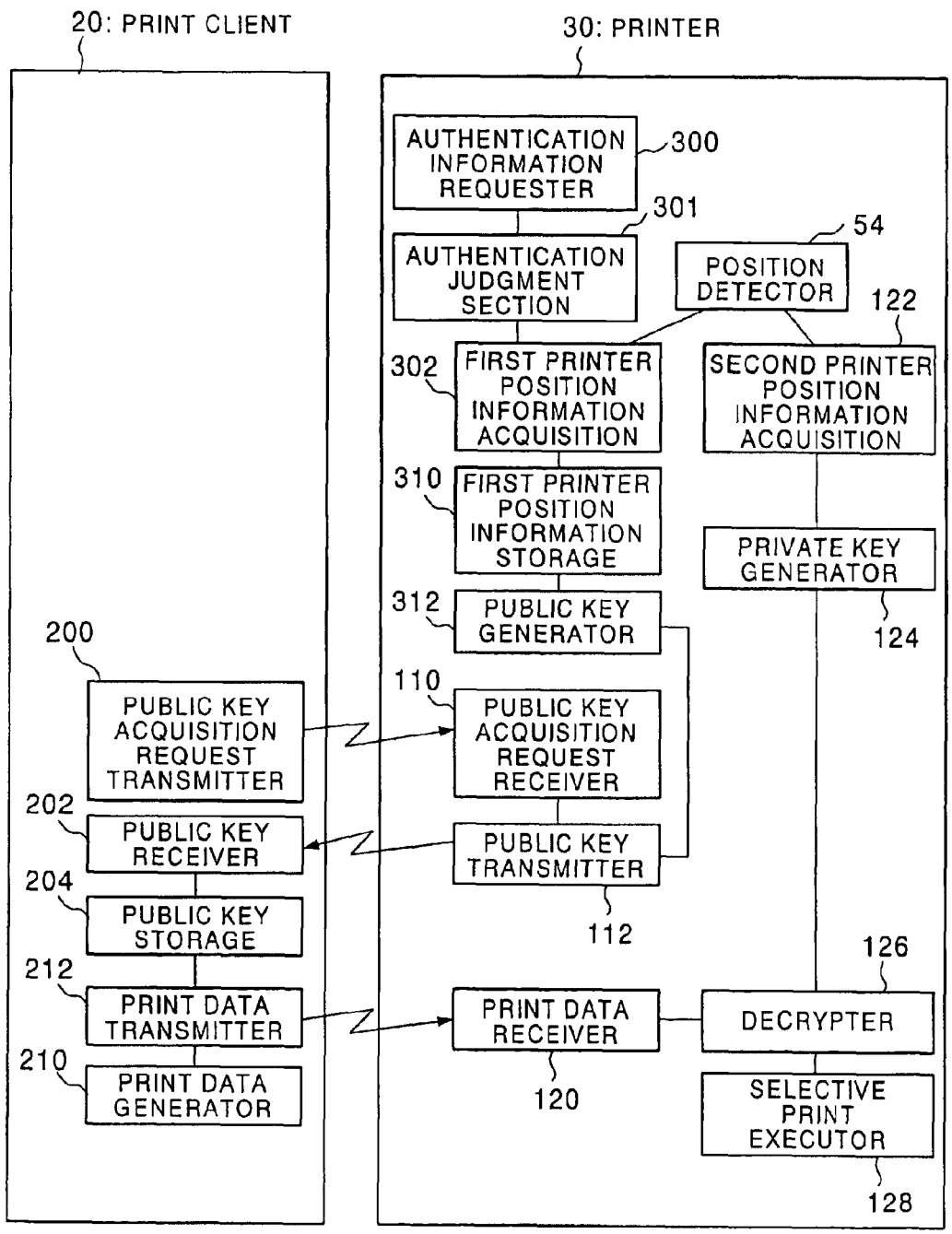
FIG. 20B is a diagram showing a hardware structure of the print client and the printer when the process according to the fifth embodiment of the present invention is realized by hardware.

FIG. 20B is a diagram showing a hardware structure of the print client 20 and the printer 30 when the aforementioned process is realized by hardware. A different point from the aforementioned FIG. 19B will be explained. If the authentication judgment section 301 judges that the operator has proper authority, then the first printer position information acquisition 302 acquires printer position information from the position detector 54 and regards the printer position information as first printer position information. The first printer position information is stored in a first printer position information storage 310.

If the public key acquisition request receiver 110 receives the public key acquisition request, then a public key generator 312 reads the first printer position information from the first printer position information storage 310 and generates a public key with a passphrase containing at least the first printer position information. The public key transmitter 112 transmits the generated public key to the print client 20.

As stated above, according to the print system of this embodiment, only when a person with proper authority provides instructions, the printer 30 stores printer position information at this point in time in the EEPROM 45, whereby the installation place where the printer 30 can execute a proper print operation can be limited.

More specifically, when an operator with proper authority requests the printer 30 to register new printer position information, the printer 30 stores printer position at this point in time in the EEPROM 45. On the other hand, in the case of an operator without proper authority, the printer 30 does not store printer position information in the EEPROM 45. When transmitting a public key to the print client 20, the printer 30 generates a public key with a passphrase containing at least the printer position information stored in the EEPROM 45 and transmits this public key.

When the print client 20 transmits the print data D05 to the printer 30, the print client 20 transmits the print transmitting data D10 generated by encrypting the print data D05 with this public key. Each time the printer 30 receives the print transmitting data D10, the printer 30 acquires printer position information at that point in time, and generates a private key with a passphrase containing this printer position information. Then, the printer 30 decrypts the print transmitting data D10 with this private key, and when the print transmitting data D10 can be decrypted, the printer 30 executes a print operation, and when the print transmitting data D10 cannot be decrypted, the printer 30 does not execute the print operation. Accordingly, if the printer position information stored in the EEPROM 45 and the printer position information when the private key is generated are different, the received print transmitting data D10 cannot be properly decrypted, so that a proper print result cannot be obtained. Thus, the position where the printer 30 can be used can be limited to a place where the person with proper authority registered the printer position information with the printer 30.

Moreover, as long as the operator has proper authority, the operator can change the printer position information stored in the EEPROM 45, and hence, even when the installation place of the printer 30 is changed for good reason by the printer manufacturer or the like, the operator can continue to use the printer 30. Namely, if the operator with proper authority instructs the printer 30 to register printer position information again in a new installation place of the printer 30, printer position information on this place is stored in the EEPROM 45. Accordingly, the printer can be used effectively.

[Sixth Embodiment]

In the sixth embodiment, a modification is made to the aforementioned fifth embodiment, and the generation of a public key is stopped when the printer 30 is moved from a place where a person with proper authority registered printer position information. Further details will be given below.

It should be mentioned that the configuration of a print system according to this embodiment is the same as that in FIG. 1 in the aforementioned first embodiment, the configuration of the printer 30 is the same as that in FIG. 2 described above, and that the configuration of the print client 20 is the same as that in FIG. 3 described above. Moreover, a print request process, a print execution process, and a printer position information registration process according to this embodiment are the same as those in the aforementioned fifth embodiment.

Figure 21:
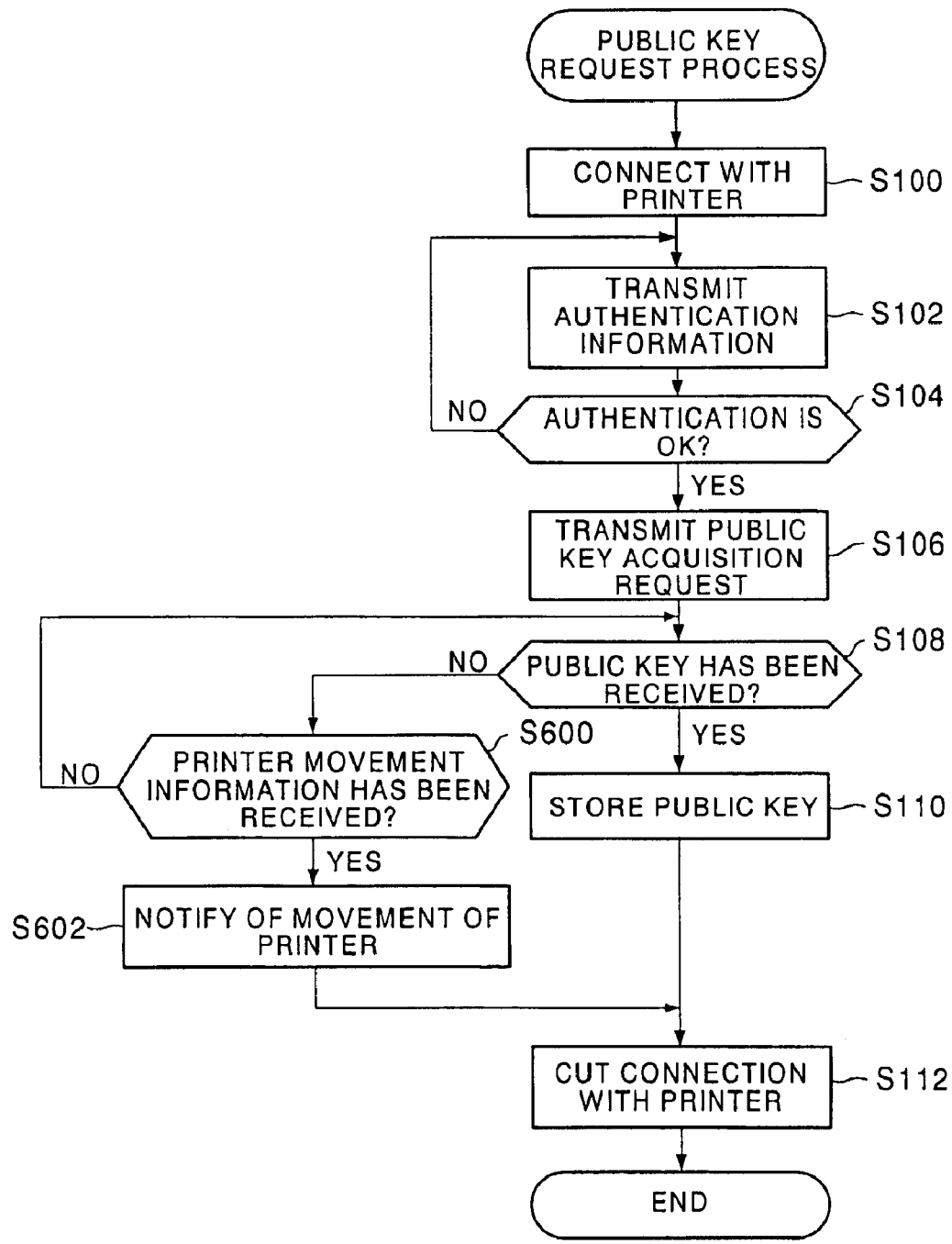
FIG. 21 is a flowchart explaining a public key request process executed by a print client according to a sixth embodiment of the present invention.

However, a public key request process according to this embodiment is slightly different from that in the aforementioned fifth embodiment. FIG. 21 is a flowchart explaining the contents of the public key request process according to this embodiment.

As shown in FIG. 21, the process from step S100 to step S112 is the same as that in the aforementioned fifth embodiment, but when it is judged in step S108 that the public key has not been received (step S108: No), it is judged whether printer movement information has been received from the printer 30 (step S600). When the printer movement information has not been received (step S600: No), the process from step S108 is repeated.

On the other hand, when the printer movement information has been received (step S600: Yes), the user is notified that the public key cannot be generated because the printer 30 has been moved from a place where a person with proper authority registered printer position information (step S602). Then, the connection with the printer 30 is cut (step S112), and the public key request process is completed.

Figure 22:
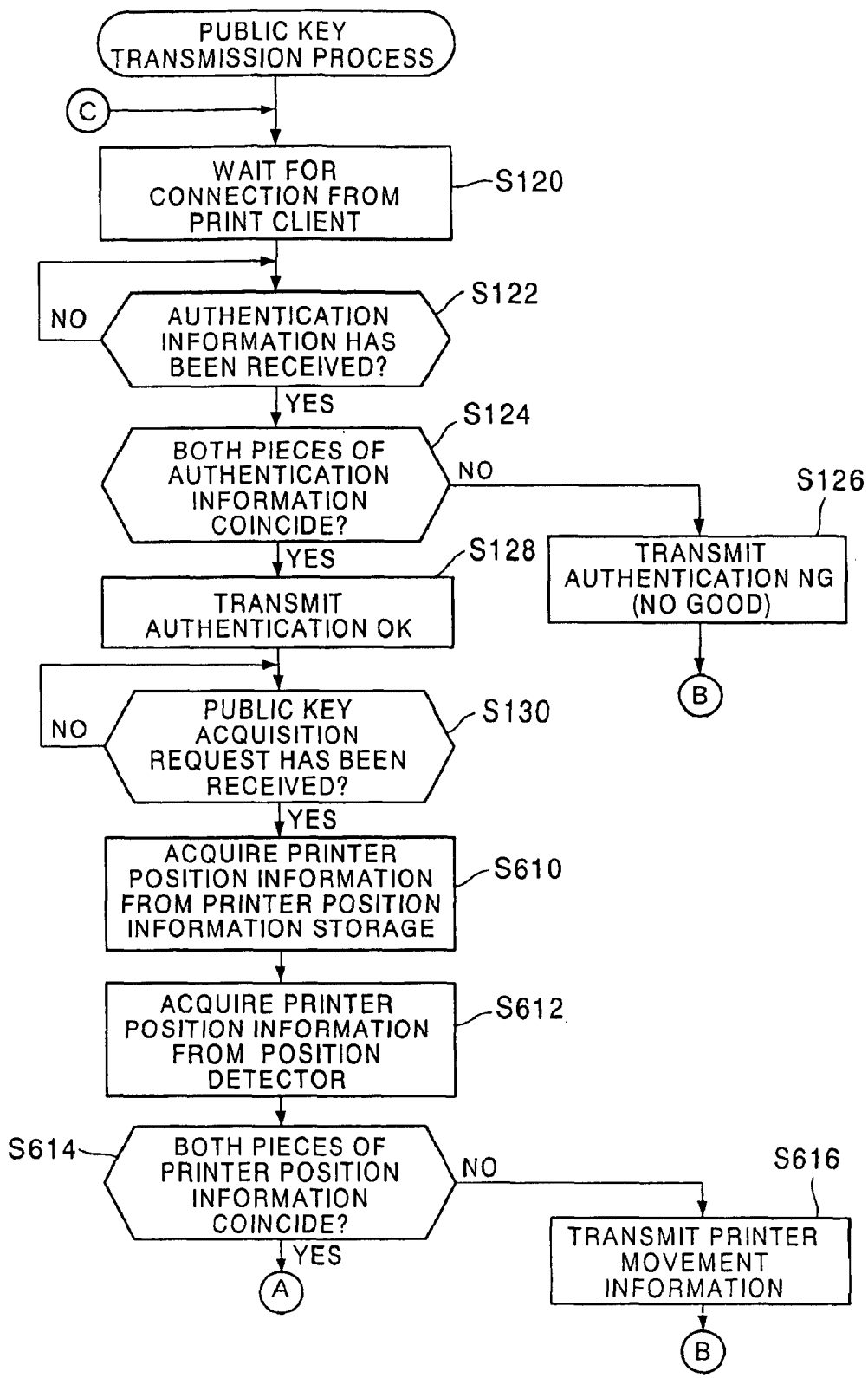
FIG. 22 is a part of a flowchart explaining a public key transmission process executed by a printer according to the sixth embodiment of the present invention (First part)
Figure 23:
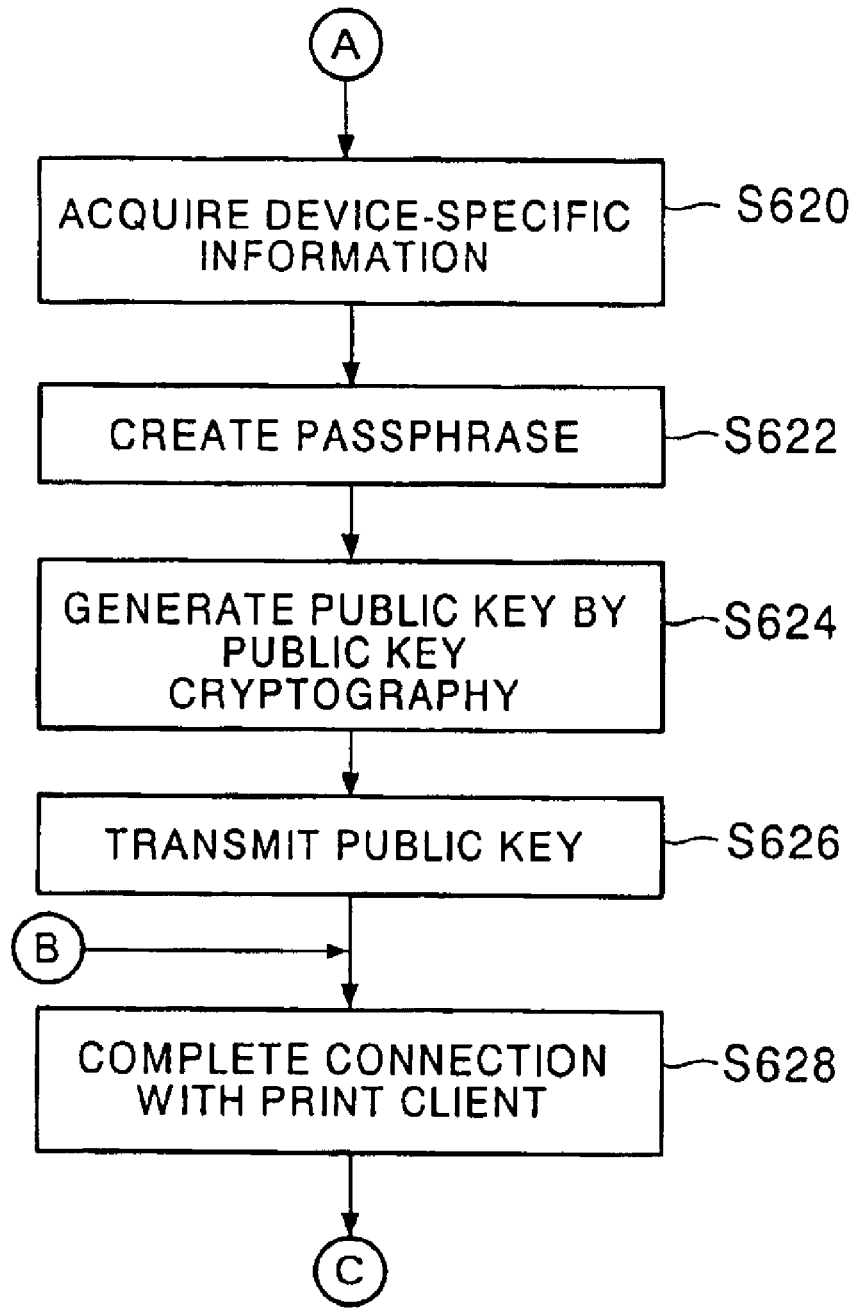
FIG. 23 is a part of the flowchart explaining the public key transmission process executed by the printer according to the sixth embodiment of the present invention (Second part)

FIG. 22 and FIG. 23 are flowcharts explaining the contents of a public key transmission process according to this embodiment. As shown in FIG. 22, the public key transmission process according to this embodiment is the same as that in the aforementioned first embodiment up to step S130.

After step S130, in the public key transmission process according to this embodiment, the printer 30 acquires printer position information stored in the printer position information storage EP20 (step S610). Subsequently, the printer 30 acquires printer position information on the printer 30 at this point in time from the position detector 54 (step S612).

Then, the printer 30 judges whether the printer position information acquired from the printer position information storage EP20 and the printer position information acquired from the position detector 54 coincide with each other (step S614). When these two piece of printer position information do not coincide (step S614: No), this indicates that the printer 30 is moved, compared with when the person with proper authority registered the printer position information in the printer position information registration process, whereby the printer 30 transmits printer movement information to the print client 20 without generating a public key (step S616). Thereafter, as shown in FIG. 23, the connection with the print client 20 is cut (step S628), and the public key transmission process is completed.

On the other hand, as shown in FIG. 22, when the printer position information acquired from the printer position information storage EP20 and the printer position information acquired from the position detector 54 coincide (step S614: Yes), the printer 30 acquires device-specific information as shown in FIG. 23 (step S620).

Then, the printer 30 creates a passphrase with the device-specific information and the printer position information acquired in step S610 or step S612 (step S622). There are various methods of creating the passphrase. In this embodiment, the passphrase is created by simply joining the printer position information after the device-specific information. Incidentally, the passphrase may contain data other than these device-specific information and printer position information.

Thereafter, the printer 30 generates a public key with the passphrase created in step S622 by the public key cryptography (step S624). Then, the printer 30 transmits the generated public key to the print client 20 (step S626). Subsequently, the printer 30 completes the connection with the print client 20 (step S628), and returns to step S120 in FIG. 22.

Figure 24:
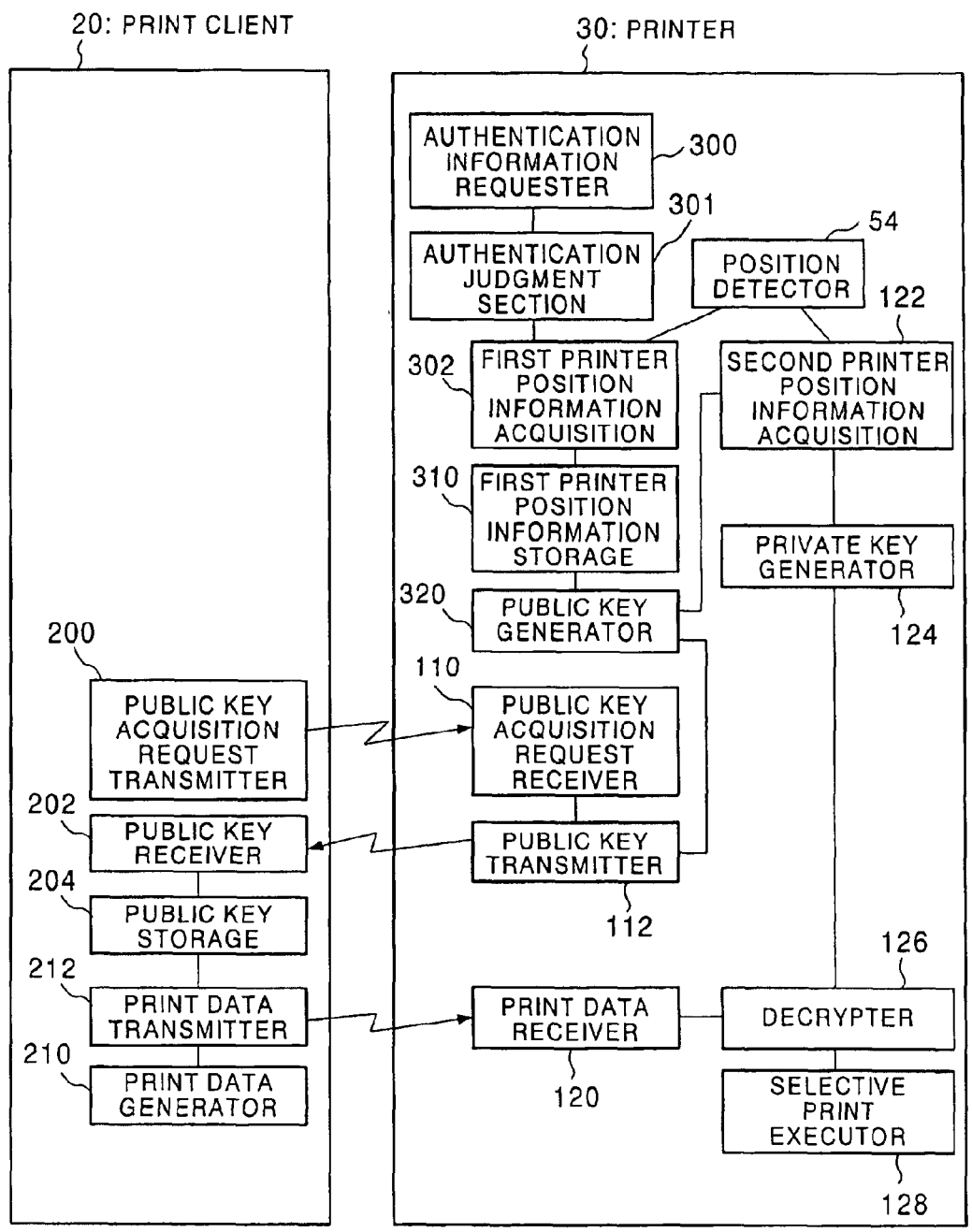
FIG. 24 is a diagram showing a hardware structure of the print client and the printer when the process according to the sixth embodiment of the present invention is realized by hardware.

FIG. 24 is a diagram showing a hardware structure of the print client 20 and the printer 30 when the aforementioned process is realized by hardware. A different point from the aforementioned FIG. 20B will be explained. If the public key acquisition request receiver 110 receives the public key acquisition request, then the second printer position information acquisition 122 acquires second printer position information from the position detector 54. Then, a public key generator 320 compares the first printer position information stored in the printer position information storage 310 and the second printer position information acquired by the second printer position information acquisition 122. If the first printer position information and the second printer position information coincide, then the public key generator 320 generates a public key with a passphrase containing at least the first printer position information or the second printer position information. A public key transmitter 122 transmits the public key generated by the public key generator 320 to the print client 20.

As stated above, according to the print system of this embodiment, the generation of a public key is stopped when the position where a person with proper authority registered printer position information with the printer 30 and the position of the printer 30 when the generation of a public key is tried are different, whereby the position where the printer 30 generates a public key and transmits the public key to the print client 20 can be limited. Hence, the position where the printer 30 can be properly used can be limited.

Moreover, as long as the operator has proper authority, the operator can change the printer position information stored in the EEPROM 45, and hence, even when the installation place of the printer 30 is changed for good reason by the printer manufacturer or the like, the operator can continue to use the printer 30. Namely, if the operator with proper authority instructs the printer 30 to register printer position information again in a new installation place of the printer 30, printer position information on this place is stored in the EEPROM 45, and a public key can be generated again. Accordingly, the printer can be used effectively.

It should be mentioned that the present invention is not limited to the aforementioned embodiments, and various changes may be made therein. For example, in the aforementioned first embodiment, the number of times the public key can be stored in the EEPROM 45 is limited to one time, but may be limited to a predetermined number of times such as two times, three times, or the like. Similarly, in the second embodiment and the third embodiment, the number of times the printer position information can be stored in the EEPROM 45 is limited to one time, but may be limited to a predetermined number of times such as two times, three times, or the like.

In the aforementioned fourth embodiment, the public key generation authentication information indicating whether the operator has proper authority or not is composed of a combination of an ID and a password, and in the fifth embodiment and the sixth embodiment, the printer position information registration authentication information indicating whether the operator has proper authority or not is composed of a combination of an ID and a password, but the public key generation authentication information and the printer position information registration authentication information are not limited to the combination of an ID and a password. For example, it is also possible that a fingerprint of a person with proper authority is registered, a fingerprint of an operator is read, and when both fingerprints coincide, it is judged that the operator has proper authority.

Further, in the aforementioned respective embodiments, the printer is explained as an example of a data receiving device which sets a limit to a position where it can be used, the present invention is not limited to the printer. Moreover, a data transmitting device is not limited to the print client.

For example, in a data transmitting and receiving system, the data transmitting device may be a digital camera for taking images and the data receiving device may be a data server which stores data on the images taken by the digital camera. In this case, data transmitted from the digital camera is encrypted with a public key received from the data server, and the data server which has received this data generates a private key by the aforementioned method and decrypts the data. When the received data can be decrypted, the data server stores the data, and the received data cannot be decrypted, the data server does not store the data.

Moreover, in the data transmitting and receiving system, the data transmitting device may be a personal computer and the data receiving device may be a projector which projects image data transmitted from the personal computer. In this case, data transmitted from the personal computer is encrypted with a public key received from the projector, and the projector which has received this data generates a private key by the aforementioned method and decrypts the data. When the received data can be decrypted, the projector projects the data, and the received data cannot be decrypted, the projector does not project the data.

Further, in the data transmitting and receiving system, the data transmitting device may be a content server for music or the like and the data receiving device may be a playback device for content data such as music transmitted from the content server. In this case, data transmitted from the content server is encrypted with a public key received from the playback device, and the playback device which has received this data generates a private key by the aforementioned method and decrypts the data. When the received data can be decrypted, the playback device plays back the data, and the received data cannot be decrypted, the playback device does not play back the data.

Furthermore, the aforementioned embodiments are explained with the case where a print medium for the printer 30 is a print sheet as an example, but the print medium is not limited to this, and the present invention can be applied to other print media such as an OHP sheet and the like.

Besides, as for each process explained in the aforementioned embodiments, it is possible to record a program to execute each process on a record medium such as a flexible disk, a CD-ROM (Compact Disc-Read Only Memory), a ROM, a memory card, or the like and distribute this program in the form of the record medium. In this case, the aforementioned embodiments can be realized by making the print client 20 and/or the printer 30 read the record medium on which this program is recorded and execute this program.

Moreover, the print client 20 and/or the printer 30 sometimes has other programs such as an operating system, other application programs, and the like. In this case, by using these other programs in the print client 20 and/or the printer 30, a command, which calls a program to realize a process equal to that in the aforesaid embodiments out of programs in the print client 20 and/or the printer 30, may be recorded on the record medium.

Further, such a program can be distributed not in the form of the record medium but in the form of a carrier wave via a network. The program transmitted in the form of the carrier wave over the network is incorporated in the print client 20 and/or the printer 30, and the aforesaid embodiments can be realized by executing this program.

Furthermore, when being recorded on the record medium or transmitted as the carrier wave over the network, the program is sometimes encrypted or compressed. In this case, the print client 20 and/or the printer 30 which has read the program from the record medium or the carrier wave needs to execute the program after decrypting or expanding the program.

What is claimed is:

1. A printer, comprising:
    a printer position information acquisition which acquires printer position information to specify a place where the printer is installed;
    a first printer position information acquisition which acquires first printer position information from the printer position information acquisition;
    a public key generator which generates a public key with a passphrase containing at least the first printer position information;
    a public key storage in which the public key generated by the public key generator is stored, the number of times the public key is allowed to be stored being limited to a predetermined number of times;
    a print data receiver which receives print data encrypted with the public key;
    a second printer position information acquisition which acquires second printer position information from the printer position information acquisition when the print data has been received;
    a private key generator which generates a private key with a passphrase containing at least the second printer position information; and
    a decrypter which decrypts the print data received by the print data receiver with the private key.

2. The printer according to claim 1, further comprising:
    a public key acquisition request receiver which receives a public key acquisition request from a print client; and
    a public key transmitter which reads the public key stored in the public key storage and transmits the public key to the print client which has transmitted the public key acquisition request.

3. The printer according to claim 1, wherein the predetermined number of times is one time.

4. The printer according to claim 3, wherein even if a private key is generated when the public key generator generates the public key, the private key is abandoned.

5. The printer according to claim 4, further comprising a selective print executor which executes a print operation based on the print data when the print data is decrypted with the private key and does not execute the print operation based on the print data when the print data is not decrypted with the private key.

6. A printer, comprising:
    a printer position information acquisition which acquires printer position information to specify a place where the printer is installed;
    a first printer position information acquisition which acquires first printer position information from the printer position information acquisition;
    a printer position information storage in which the first printer position information acquired by the first printer position information acquisition is stored, the number of times the first printer position information is allowed to be stored being limited to a predetermined number of times;
    a public key generator which reads the first printer position information from the printer position information storage and generates a public key with a passphrase containing at least the first printer position information;
    a print data receiver which receives print data encrypted with the public key;
    a second printer position information acquisition which acquires second printer position information from the printer position information acquisition when the print data has been received;
    a private key generator which generates a private key with a passphrase containing at least the second printer position information; and
    a decrypter which decrypts the print data received by the print data receiver with the private key.

7. The printer according to claim 6, further comprising a public key acquisition request receiver which receives a public key acquisition request from a print client, wherein the public key generator generates the public key when the public key acquisition request receiver has received the public key acquisition request.

8. The printer according to claim 7, further comprising a public key transmitter which transmits the public key generated by the public key generator to the print client which has transmitted the public key acquisition request.

9. The printer according to claim 6, wherein the predetermined number of times is one time.

10. The printer according to claim 9, wherein even if a private key is generated when the public key generator generates the public key, the private key is abandoned.

11. The printer according to claim 6, further comprising a selective print executor which executes a print operation based on the print data when the print data is decrypted with the private key and does not execute the print operation based on the print data when the print data is not decrypted with the private key.

12. A printer, comprising:
a printer position information acquisition which acquires printer position information to specify a place where the printer is installed;
a first printer position information acquisition which acquires first printer position information from the printer position information acquisition;
a printer position information storage in which the first printer position information acquired by the first printer position information acquisition is stored, the number of times the first printer position information is allowed to be stored being limited to a predetermined number of times;
a public key acquisition request receiver which receives a public key acquisition request to request acquisition of a public key;
a second printer position information acquisition which acquires second printer position information from the printer position information acquisition when the public key acquisition receiver has received the public key acquisition request; and
a public key generator which compares the first printer position information stored in the printer position information storage and the second printer position information acquired by the second printer position information acquisition, and which generates a public key with a passphrase containing at least the first printer position information or the second printer position information when the first printer position information and the second printer position information coincide.

13. The printer according to claim 12, further comprising a public key transmitter which transmits the public key generated by the public key generator to a print client which has transmitted the public key acquisition request.

14. The printer according to claim 13, further comprising:
a print data receiver which receives print data encrypted with the public key;
a third printer position information acquisition which acquires printer position information from the printer position information acquisition when the print data has been received and regards this printer position information as third printer position information;
a private key generator which generates a private key with a passphrase containing at least the third printer position information; and
a decrypter which decrypts the print data received by the print data receiver with the private key.

15. The printer according to claim 12, wherein the predetermined number of times is one time.

16. The printer according to claim 15, wherein even if a private key is generated when the public key generator generates the public key, the private key in abandoned.

17. The printer according to claim 16, further comprising a selective print executor which executes a print operation based on the print data when the print data is decrypted with the private key and does not execute the print operation based on the print data when the print data is not decrypted with the private key.

18. A control method of a printer, comprising the steps of:
acquiring first printer position information to specify a place where the printer is installed from a printer position information acquisition;
storing the first printer position information in a printer position information storage, the number of times the first printer position information is allowed to be stored being limited to a predetermined number of times;
reading the first printer position information from the printer position information storage and generating a public key with a passphrase containing at least the first printer position information;
receiving print data encrypted with the public key;
acquiring second printer position information from the printer position information acquisition when the print data has been received;
generating a private key with a passphase containing at least the second printer position information; and
decrypting the received print data with the private key.

19. A control method of a printer, comprising the steps of:
acquiring first printer position information to specify a place where the printer is installed from a printer position information acquisition;
storing the first printer position information in a printer position information storage, the number of times the first printer position information is allowed to be stored being limited to a predetermined number of times;
receiving a public key acquisition request to request acquisition of a public key;
acquiring second printer position information from the printer position information acquisition when the public key acquisition request has been received; and
comparing the first printer position information stored in the printer position information storage and the acquired second printer position information, and generating a public key with a passphrase containing at least the first printer position information or the second printer position information when the first printer position information and the second printer position information coincide.

20. A print system including a printer and a print client, wherein
the printer comprises:
a printer position information acquisition which acquires printer position information to specify a place where the printer is installed;
a first printer position information acquisition which acquires first printer position information from the printer position information acquisition;
a public key generator which generates a public key with a passphrase containing at least the first printer position information; and
a public key storage in which the public key generated by the public key generator is stored, the number of times the public key is allowed to be stored being limited to a predetermined number of times,
the print client comprises:
a print data generator which generates print data to be printed by the printer; and
a print data transmitter which encrypts the print data with the public key and transmits the encrypted print data to the printer, and
the printer further comprises;
a print data receiver which receives the print data;
a second printer position information acquisition which acquires second printer position information from the printer position information acquisition when the print data has been received;
a private key generator which generates a private key with a passphrase containing at least the second printer position information; and a decrypter which decrypts the print data received by the print data receiver with the private key.

21. A print system including a printer and a print client, wherein the printer comprises:

a printer position information acquisition which acquires printer position information to specify a place where the printer is installed a first printer position information acquisition which acquires first printer position information from the printer position information acquisition;

a printer position information storage in which the first printer position information acquired by the first printer position information acquisition is stored, the number of times the first printer position information is allowed to be stored being limited to a predetermined number of times; and a public key generator which reads the first printer position information from the printer position information storage and generates a public key with a passphase containing at least the first printer position information, the print client comprises:

a print data generator which generates print data to be printed by the printer, and a print data transmitter which encrypts the print data with the public key and transmits the encrypted print data to the printer, and the printer further comprises:

a print data receiver which receives the print data;

a second printer position information acquisition which acquires second printer position information from the printer position information acquisition when the print data has been received;

a private key generator which generates a private key with a passphrase containing at least the second printer position information; and a decrypter which decrypts the print data received by the print data receiver with the private key.

22. A print system including a printer and a print client, wherein the printer comprises:

a printer position information acquisition which acquires printer position information to specify a place where the printer is installed;

a first printer position information acquisition which acquires first printer position information from the printer position information acquisition; and a printer position information storage in which the first printer position information acquired by the first printer position information acquisition is stored, the number of times the first printer position information is allowed to be stored being limited to a predetermined number of times, the print client comprises:

a public key acquisition request transmitter which transmits a public key acquisition request to request acquisition of a public key, and the printer further comprises:

a public key acquisition request receiver which receives the public key acquisition request;

a second printer position information acquisition which acquires second printer position information from the printer position information acquisition when the public key acquisition receiver has received the public key acquisition request; and a public key generator which compares the first printer position information stored in the printer position information storage and the second printer position information acquired by the second printer position information acquisition, and generates a public key with a passphrase containing at least the first printer position information or the second printer position information when the first printer position information and the second printer position information coincide.

23. A printer, comprising:

a printer position information acquisition which acquires printer position information to specify a place where the printer is installed;

a public key generator which acquires first printer position information from the printer position information acquisition, and generates a public key with a passphrase containing at least the first printer position information, when a person with proper authority makes a request;

a public key storage in which the public key generated by the public key generator is stored;

a print data receiver which receives print data encrypted with the public key;

a second printer position information acquisition which acquires second printer position information from the printer position, information acquisition when the print data has been received;

a private key generator which generates a private key with a passphrase containing at least the second printer position information, and a decrypter which decrypts the print data received by the print data receiver with the private key.

24. The printer according to claim 23, further comprising:

a public key acquisition request receiver which receives a public key acquisition request from a print client; and a public key transmitter which reads the public key stored in the public key storage and transmits the public key to the print client which has transmitted the public key acquisition request.

25. The printer according to claim 23, further comprising:

an authentication information requester which requests authentication information of an operator; and an authentication judgment section which, when authentication information has been inputted, judges whether the inputted authentication information coincides with registered authentication information and, when these two pieces of authentication information coincide, judges that the operator has proper authority.

26. The printer according to claim 25, wherein even if a private key is generated when the public key generator generates the public key, the private key is abandoned.

27. The printer according to claim 26, further comprising a selective print executor which executes a print operation based on the print data when the print data is decrypted with the private key and does not execute the print operation based on the print data when the print data is not decrypted with the private key.

28. A printer, comprising:

a printer position information acquisition which acquires printer position information to specify a place where the printer is installed;

a first printer position information acquisition and storage which acquires first printer position information from the printer position information acquisition, and stores the first printer position information in a printer position information storage, when a person with proper authority makes a request;

a public key generator which reads the first printer position information from the printer position information storage and generates a public key with a passphrase containing at least the first printer position information;

a print data receiver which receives print data encrypted with the public key;

a second printer position information acquisition which acquires second printer position information from the printer position information acquisition when the print data has been received;

a private key generator which generates a private key with a passphrase containing at least the second printer position information; and a decrypter which decrypts the print data received by the print data receiver with the private key.

29. The printer according to claim 28, further comprising:
a public key acquisition request receiver which receives a public key acquisition request from a print client, wherein
the public key generator generates the public key when the public key acquisition request receiver has received the public key acquisition request.

30. The printer according to claim 29, further comprising a public key transmitter which transmits the public key generated by the public key generator to the print client which has transmitted the public key acquisition request.

31. The printer according to claim 28, further comprising:
an authentication information requester which requests authentication information of an operator, and
an authentication judgment section which, when authentication information has been inputted, judges whether the inputted authentication information coincides with registered authentication information and, when these two pieces of authentication information coincide, judges that the operator has proper authority.

32. The printer according to claim 31, wherein even if a private key is generated when the public key generator generates the public key, the private key is abandoned.

33. The printer according to claim 32, further comprising a selective print executor which executes a print operation based on the print data when the print data is decrypted with the private key and does not execute the print operation based on the print data when the print data is not decrypted with the private key.

34. A printer, comprising:
a printer position information acquisition which acquires printer position information to specify a place where the printer is installed;
a first printer position information acquisition and storage which acquires first printer position information from the printer position information acquisition, and stores the first printer position information in a printer position information storage, when a person with proper authority makes a request;
a public key acquisition request receiver which receives a public key acquisition request to request acquisition of a public key;
a second printer position information acquisition which acquires second printer position information from the printer position information acquisition when the public key acquisition receiver has received the public key acquisition request; and
a public key generator which compares the first printer position information stored in the printer position information storage and the second printer position information acquired by the second printer position information acquisition, and generates a public key with a passphrase containing at least the first printer position information or the second printer position information when the first printer position information and the second printer position information coincide.

35. The printer according to claim 34, comprising a public key transmitter which transmits the public key generated by the public key generator to a print client which has transmitted the public key acquisition request.

36. The printer according to claim 35, further comprising:
a print data receiver which receives print data encrypted with the public key;
a third printer position information acquisition which acquires printer position information from the printer position information acquisition when the print data has been received and regards this printer position information as third printer position information;
a private key generator which generates a private key with a passphrase containing at least the third printer position information; and
a decrypter which decrypts the print data received by the print data receiver with the private key.

37. The printer according to claim 34, further comprising:
an authentication information requester which requests authentication information of an operator; and
an authentication judgment section which, when authentication information has been inputted, judges whether the inputted authentication information coincides with registered authentication information and, when these two pieces of authentication information coincide, judges that the operator has proper authority.

38. The printer according to claim 37, wherein even if a private key is generated when the public key generator generates the public key, the private key is abandoned.

39. The printer according to claim 38, further comprising a selective print executor which executes a print operation based on the print data when the print data is decrypted with the private key and does not execute the print operation based on the print data when the print data is not decrypted with the private key.

40. A control method of a printer, comprising the steps of:
acquiring first printer position information from a printer position information acquisition to specify a place where the printer is installed, and storing the first printer position information in a printer position information storage, when a person with proper authority makes a request;
reading the first printer position information from the printer position information storage and generating a public key with a passphrase containing at least the first printer position information;
receiving print data encrypted with the public key; acquiring second printer position information from the printer position information acquisition when the print data has been received;
generating a private key with a passphrase containing at least the second printer position information; and
decrypting the received print data with the private key.

41. A control method of a printer, comprising the steps of:
acquiring first printer position information to specify a place where the printer is installed from a printer position information acquisition, and storing the first printer position information in a printer position information storage, when a person with proper authority makes a request;

receiving a public key acquisition request to request acquisition of a public key;

acquiring second printer position information from the printer position information acquisition when the public key acquisition request has been received; and comparing the first printer position information stored in the printer position information storage and the acquired second printer position information, and generating a public key with a passphrase containing at least the first printer position information or the second printer position information when the first printer position information and the second printer position information coincide.

42. A print system including a printer and a print client, wherein the printer comprises:

a first printer position information acquisition which acquires printer position information to specify a place where the printer is installed;

a public key generator which acquires first printer position information from the first printer position information acquisition, and generates a public key with a passphrase containing at least the first printer position information, when a person with proper authority makes a request; and a public key storage in which the public key generated by the public key generator is stored, the print client comprises:

a print data generator which generates print data to be printed by the printer, and a print data transmitter which encrypts the print data with the public key and transmits the encrypted print data to the printer, and the printer further comprises:

a print data receiver which receives the print data encrypted with the public key;

a second printer position information acquisition which acquires second printer position information from the second printer position information acquisition when the print data has been received;

a private key generator which generates a private key with a passphrase containing at least the second printer position information; and a decrypter which decrypts the print data received by the print data receiver with the private key.

43. A print system including a printer and a print client, wherein the printer comprises:

a printer position information acquisition which acquires printer position information to specify a place where the printer is installed;

a first printer position information acquisition and storage which acquires first printer position information from the printer position information acquisition, and stores the first printer position information in a printer position information storage, when a person with proper authority makes a request; and a public key generator which reads the first printer position information from the printer position information storage and generates a public key with a passphrase containing at least the first printer position information, the print client comprises:

a print data generator which generates print data to be printed by the printer; and a print data transmitter which encrypts the print data with the public key and transmits the encrypted print data to the printer, and the printer further comprises:

a print data receiver which receives print data encrypted with the public key;

a second printer position information acquisition which acquires second printer position information from the printer position information acquisition when the print data has been received;

a private key generator which generates a private key with a passphrase containing at least the second printer position information; and a decrypter which decrypts the print data received by the print data receiver with the private key.

44. A print system including a printer and a print client, wherein the printer comprises:

a printer position information acquisition which acquires printer position information to specify a place where the printer is installed; and a first printer position information acquisition and storage which acquires first printer position information from the printer position information acquisition, and stores the first printer position information in a printer position information storage, when a person with proper authority makes a request, the print client comprises:

a public key acquisition request transmitter which transmits a public key acquisition request to request acquisition of a public key, and the printer further comprises:

a public key acquisition request receiver which receives the public key acquisition request;

a second printer position information acquisition which acquires second printer position information from the printer position information acquisition when the public key acquisition receiver has received the public key acquisition request; and a public key generator which compares the first printer position information stored in the printer position information storage and the second printer position information acquired by the second printer position information acquisition, and generates a public key with a passphrase containing at least the first printer position information or the second printer position information when the first printer position information and the second printer position information coincide.

* * * * *